(12) United States Patent
Luo et al.

(10) Patent No.: US 11,579,777 B2
(45) Date of Patent: Feb. 14, 2023

(54) DATA WRITING METHOD, CLIENT SERVER, AND SYSTEM

(71) Applicant: HUAWEI TECHNOLOGIES CO., LTD., Guangdong (CN)

(72) Inventors: Siwei Luo, Chengdu (CN); Lei Zhang, Shenzhen (CN); Feng Wang, Chengdu (CN); Xin Fang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/029,285

(22) Filed: Sep. 23, 2020

(65) Prior Publication Data

US 2021/0004166 A1 Jan. 7, 2021

Related U.S. Application Data

(63) Continuation of application No. PCT/CN2018/083107, filed on Apr. 13, 2018.

(30) Foreign Application Priority Data

Mar. 30, 2018 (WO) ................ PCT/CN2018/081466

(51) Int. Cl.
*G06F 3/06* (2006.01)
*G06F 11/10* (2006.01)

(52) U.S. Cl.
CPC .......... *G06F 3/0619* (2013.01); *G06F 3/0644* (2013.01); *G06F 3/0676* (2013.01); *G06F 11/1076* (2013.01); *G06F 2211/1035* (2013.01)

(58) Field of Classification Search
None
See application file for complete search history.

(56) References Cited

U.S. PATENT DOCUMENTS

| | | | | |
|---|---|---|---|---|
| 5,522,065 A | * | 5/1996 | Neufeld | G06F 11/1076 711/100 |
| 5,583,876 A | * | 12/1996 | Kakuta | G06F 11/1076 711/114 |
| 5,787,460 A | * | 7/1998 | Yashiro | G06F 11/1076 711/113 |
| 5,860,090 A | * | 1/1999 | Clark | G06F 11/1076 711/113 |

(Continued)

FOREIGN PATENT DOCUMENTS

| | | | |
|---|---|---|---|
| CN | 102088389 A | | 6/2011 |
| CN | 102752402 A | | 10/2012 |

(Continued)

OTHER PUBLICATIONS

Jin et al. (Improving Partial Stripe Write Performance in RAID Level 5). ISBN: 0-7803-4434-0 IEEE, pp. 396-400 (Year: 1998).*

(Continued)

*Primary Examiner* — Kaushikkumar M Patel

(57) ABSTRACT

In a method disclosed for writing data, a device receives data, divides the data into one or more data fragments, obtains a first parity fragment based on the one or more data (Continued)

fragments and a second parity fragment of a written data fragment in a stripe distributed across a plurality of nodes, stores the one or more data fragments and the first parity fragment in the stripe.

4 Claims, 15 Drawing Sheets

(56) References Cited

U.S. PATENT DOCUMENTS

| | | | | |
|---|---|---|---|---|
| 6,195,727 B1* | 2/2001 | Islam | ............... | G06F 11/1076 |
| | | | | 711/114 |
| 6,343,343 B1 | 1/2002 | Menon et al. | | |
| 7,426,611 B1* | 9/2008 | Gupta | ............... | G06F 12/0897 |
| | | | | 711/119 |
| 8,799,535 B2 | 8/2014 | Hluchyj et al. | | |
| 2003/0188097 A1* | 10/2003 | Holland | ............... | G06F 11/1076 |
| | | | | 711/114 |
| 2006/0053287 A1 | 3/2006 | Kitamura | | |
| 2007/0088864 A1* | 4/2007 | Foster | ............... | G06F 13/28 |
| | | | | 710/22 |
| 2008/0092029 A1* | 4/2008 | Arakawa | ............... | G06F 11/1076 |
| | | | | 714/801 |
| 2009/0198885 A1* | 8/2009 | Manoj | ............... | G06F 3/0689 |
| | | | | 711/114 |
| 2012/0036311 A1* | 2/2012 | Jeong | ............... | G06F 12/0873 |
| | | | | 711/103 |
| 2012/0290905 A1* | 11/2012 | Krishnamurthy | ... | G06F 11/1076 |
| | | | | 714/800 |
| 2016/0246677 A1 | 8/2016 | Sangamkar et al. | | |
| 2017/0111764 A1 | 4/2017 | Chou | | |
| 2017/0272100 A1 | 9/2017 | Yanovsky et al. | | |
| 2019/0012270 A1* | 1/2019 | Imazaki | ............... | G06F 11/1076 |

FOREIGN PATENT DOCUMENTS

| | | |
|---|---|---|
| CN | 102841931 A | 12/2012 |
| CN | 103699494 A | 4/2014 |
| CN | 105339913 A | 2/2016 |
| CN | 107436733 A | 12/2017 |
| EP | 0726520 A2 | 8/1996 |

OTHER PUBLICATIONS

Hartman et al. (The Zebra Striped Network File System; pp. 274-310). ACM 0734-2071 Aug. 1995. (Year: 1995).*

Donghyuk Lee et al.,"Tiered-latency DRAM: A low latency and low cost DRAM architecture",2013 IEEE 19th International Symposium on High Performance Computer Architecture (HPCA),total 12 pages.

Zhangyibin,"Design and Implementation of Client for A Distributed File System",Shanghai Jiao Tong University,2012, with an English abstract, total 74 pages.

Lukun,"Key Technology Researchonlog Storage and Analysis System on Cloud Platform",University of Science and Technology of China,Jun. 2015,with an English abstract,total 121 pages.

Andrew J. deMello,"Droplet-based microfluidics: Towards ultra-high-throughput chemistry and biology",IET/SynbiCITE Engineering Biology Conference,Date of Conference: Dec. 13-15, 2016,Total 1 Page.

* cited by examiner

DATA WRITING METHOD, CLIENT SERVER, AND SYSTEM

CROSS-REFERENCE TO RELATED APPLICATION

This application is a continuation of International Application No. PCT/CN2018/083107, filed on Apr. 13, 2018, which claims priority to International Application No. PCT/CN2018/081446, filed on Mar. 30, 2018. The disclosures of the aforementioned applications are hereby incorporated by reference in their entireties.

TECHNICAL FIELD

This disclosure relates to the field of information technology, and more specifically, to a data writing method, a client server, and a system.

BACKGROUND

In a scenario of a distributed storage system, storage nodes are widely distributed in a plurality of regions. With the rise of application services such as artificial intelligence, image storage and retrieval, social networking, and map navigation, a data amount generated by the application services increases exponentially, and higher requirements are imposed on a processor that processes data and a storage medium that stores data. To store massive data, an enterprise user, a data center infrastructure, and the like need a large quantity of hard disks. The massive data also causes a problem of data reliability.

To ensure high reliability of data reading and writing, an erasure coding (EC) technology may be introduced in the distributed storage system. In the EC technology, data is divided to obtain a data fragment, then a parity fragment is calculated, and fragments are separately stored into different nodes.

An EC 4+2 mode is used as an example. One stripe includes four data shards and two parity shards, separately used to store data fragments and parity fragments. If a length of data meets a full-stripe write operation (that is, the data can be divided into four complete fragments each having a size of a shard), first, a division operation needs to be performed on the data that needs to be written, to obtain four complete data fragments, where a size of each fragment (equal to the size of the shard) is fixed. Then, two parity fragments are calculated by performing an exclusive OR operation. Finally, the six fragments are separately written into specified nodes, to complete a fragment persistency process. Till now, one full-stripe write operation is completed. Alternatively, if data does not meet a full-stripe condition, that is, the data is insufficient to be divided into four complete fragments each having a size of a shard, a '0' filling operation is performed to obtain four complete fragments. Then, parity fragments of the four complete fragments are calculated, and then all data fragments and parity fragments are separately written into specified nodes. However, the '0' filling operation leads to invalid overheads of hard disk space, and increases a total quantity of stripes needed by the data.

SUMMARY

This disclosure provides a data writing method, a client server, and a system, to reduce a total quantity of stripes needed by data.

According to a first aspect, a data writing method is provided, and the method includes:

receiving, by a client server, first data;

obtaining write location information of a target stripe, where the write location information indicates a location that is of a written data fragment in the target stripe, the target stripe includes a plurality of shards, each shard corresponds to one storage node, the storage node communicates with the client server, and the target stripe is not full;

obtaining, by the client server, one or more data fragments of the first data, where each data fragment corresponds to one shard having idle space in the plurality of shards, and the one or more data fragments of the first data are generated based on the write location information, or the one or more data fragments of the first data are generated based on a size of a shard; and sending, by the client server, a write request to a storage node of a shard corresponding to the one or more data fragments of the first data, where the write request is used to store the one or more data fragments of the first data into the corresponding shard.

In the technical solution of this embodiment of this disclosure, a data fragment of data is written based on the write location information, and when the data does not meet a full-stripe condition (a stripe allocated to the data is not full after the data is written into the stripe), a '0' filling operation does not need to be performed, so that overheads of hard disk space can be reduced, and a total quantity of stripes needed by data can be reduced. Correspondingly, because the total quantity of stripes is reduced, (1) stripe management complexity can be reduced, (2) a speed of searching for a stripe can be increased, and (3) a quantity of stripes needing to be recovered from a fault can be reduced, and a fault rectification speed can be increased. On the contrary, in the prior art, when data does not meet a full-stripe condition, on one hand, '0s' may be added to obtain a full stripe; on the other hand, after receiving a new write request, the client server cannot write new data into a stripe that is not full, leading to a stripe waste.

In some possible implementations, the write location information is used to indicate an end location of the written data fragment in the target stripe; and that the one or more data fragments of the first data are generated based on the write location information specifically includes one of the following cases:

when the end location of the written data fragment in the target stripe is an end location of a particular shard, the first data is divided based on a size of the shard, to generate the one or more data fragments of the first data, and if a size of the first data is less than the size of the shard, the first data is used as one data fragment; and when the end location of the written data fragment in the target stripe is not the end location of the particular shard, one data fragment is first divided from the first data based on a size of a portion that is of the particular shard and in which no data is written, where the data fragment obtained through division corresponds to the portion that is of the particular shard and in which no data is written; then a remaining part of the first data is divided based on the size of the shard, where each data fragment divided from the remaining part of the first data corresponds to one empty shard; and if the size of the first data is less than the size of the portion that is of the particular shard and in which no data is written, the first data is used as one data fragment.

The one or more data fragments of the first data are generated based on the write location information, so that the generated data fragment may correspond to a portion that is of the target stripe and in which no data is written, and the data fragment may be written into the portion that is of the target stripe and in which no data is written, to reduce the overheads of the hard disk space, and reduce the total quantity of stripes needed by the data.

In some possible implementations, that the one or more data fragments of the first data are generated based on a size of a shard specifically includes:

the first data is divided based on the size of the shard, to generate the one or more data fragments of the first data, and if a size of the first data is less than the size of the shard, the first data is used as one data fragment.

In some possible implementations, when the first data meets a first condition, the one or more data fragments of the first data are generated based on the write location information, or when the first data meets a second condition, the one or more data fragments of the first data are generated based on the size of the shard.

In some possible implementations, the write location information includes an offset of the written data fragment in the target stripe, and a number of a node of the written data fragment.

In some possible implementations, the target stripe includes a parity fragment of the written data fragment, and after the obtaining, by the client server, one or more data fragments of the first data, the method further includes:

calculating a common parity fragment of the written data fragment and the one or more data fragments based on the one or more data fragments and the parity fragment of the written data fragment; and storing the calculated parity fragment into a parity shard of the target stripe.

In some possible implementations, a buffer of the client server includes a parity fragment of the written data fragment, and after the obtaining, by the client server, one or more data fragments of the first data, the method further includes:

calculating a common parity fragment of the written data fragment and the one or more data fragments based on the one or more data fragments and the parity fragment of the written data fragment;

storing the calculated parity fragment into the buffer of the client server; and after all data shards of the target stripe are full of data fragments, storing, into a parity shard of the target stripe, a parity fragment that corresponds to the target stripe and that is in the buffer of the client server.

In some possible implementations, the storage node includes a parity node used to store a parity fragment, and in addition to that the client server sends the write request, the method further includes:

sending the one or more data fragments to one or more parity nodes for backup; and after all data shards of the target stripe are full of data fragments, instructing the one or more parity nodes to generate a parity fragment based on all data fragments in the target stripe that are backed up, and storing the generated parity fragment into a parity shard of the target stripe.

In some possible implementations, the obtaining, by the client server, one or more data fragments of the first data includes one of the following cases:

dividing, by the client server, the first data to generate the one or more data fragments of the first data; and sending, by the client server, the write location information and the first data to an application server, and then obtaining the one or more data fragments of the first data from the application server.

In some possible implementations, before the receiving, by a client server, first data, the method further includes:

receiving, by the client server, second data;

obtaining an unused stripe as the target stripe, where a size of the second data is less than a size of the target stripe;

obtaining at least one data fragment of the second data, where the data fragment of the second data is generated based on the size of the shard;

determining a shard corresponding to the data fragment of the second data;

writing the data fragment of the second data into the corresponding shard; and recording a write location of the data fragment of the second data in the target stripe as the write location information.

In some possible implementations, the write location information is stored in a memory of the client server, or the write location information is stored in a metadata server.

In some possible implementations, the write location information may include an identifier of a node of a last data shard that is of the stripe and in which data is written and an offset that is of written data in the stripe and that is relative to a start location of the stripe.

In some possible implementations, a metadata server in a storage system may store a mapping relationship between a stripe and a node, and send, to the client server, information about the stripe and information about a data node and a parity node that correspond to the stripe.

In some possible implementations, a new data fragment may continue to be written in an appending manner.

In such data writing manner, on one hand, the hard disk space can be efficiently used as far as possible, to avoid occurrence of idle space between data; on the other hand, a flash storage medium can be better adapted to, to improve reading and writing performance, implement chip wear leveling, and increase a service life of the medium.

In some possible implementations, when a stripe is full, the stripe may be marked as full in the metadata server.

In the technical solution of this embodiment of this disclosure, because '0' filling data is not needed, transmission and persistency of the '0' filling data are avoided, write amplification and an operation of migrating invalid data are reduced, and storage efficiency of the storage system can be improved.

According to a second aspect, a client server is provided, and includes modules that perform the method in the first aspect or any possible implementation of the first aspect.

According to a third aspect, a client server is provided, and includes a processor and a memory. The memory is configured to store an instruction, and the processor is configured to execute the instruction stored in the memory, to perform the method in the first aspect or any possible implementation of the first aspect.

According to a fourth aspect, a system is provided. The system includes the client server in the second aspect or the third aspect, and a plurality of nodes. The plurality of nodes are configured to store data to be written by the client server.

According to a fifth aspect, a computer readable medium is provided, configured to store a computer program. The computer program includes an instruction used to perform the method in the first aspect or any possible implementation of the first aspect.

DESCRIPTION OF EMBODIMENTS

The following describes the technical solutions in this disclosure with reference to the accompanying drawings.

The technical solutions of the embodiments of this disclosure may be applied to various storage systems. The following describes the technical solutions of the embodiments of this disclosure by using a distributed storage system as an example, but this is not limited in the embodiments of this disclosure. In the distributed storage system, data (for example, a file or an object) is stored in a plurality of storage devices in a distributed manner, and the plurality of storage devices share a storage load. This storage manner not only improves reliability, availability, and access efficiency of the system, but also is good for scalability. The storage device is, for example, a server, or a combination of a storage controller and a storage medium.

In the embodiments of the present disclosure, a client server receives first data; and obtains write location information of a target stripe, where a data fragment of other data has been written in the target stripe, and the write location information indicates a location that is of a written data fragment in the target stripe; and writes a data fragment of the first data into the target stripe according to a location of the target stripe in an appending manner. This is equivalent to writing data fragments of a plurality of pieces of data into a same stripe at different moments, to reduce a total quantity of stripes needed by data.

Figure 1:
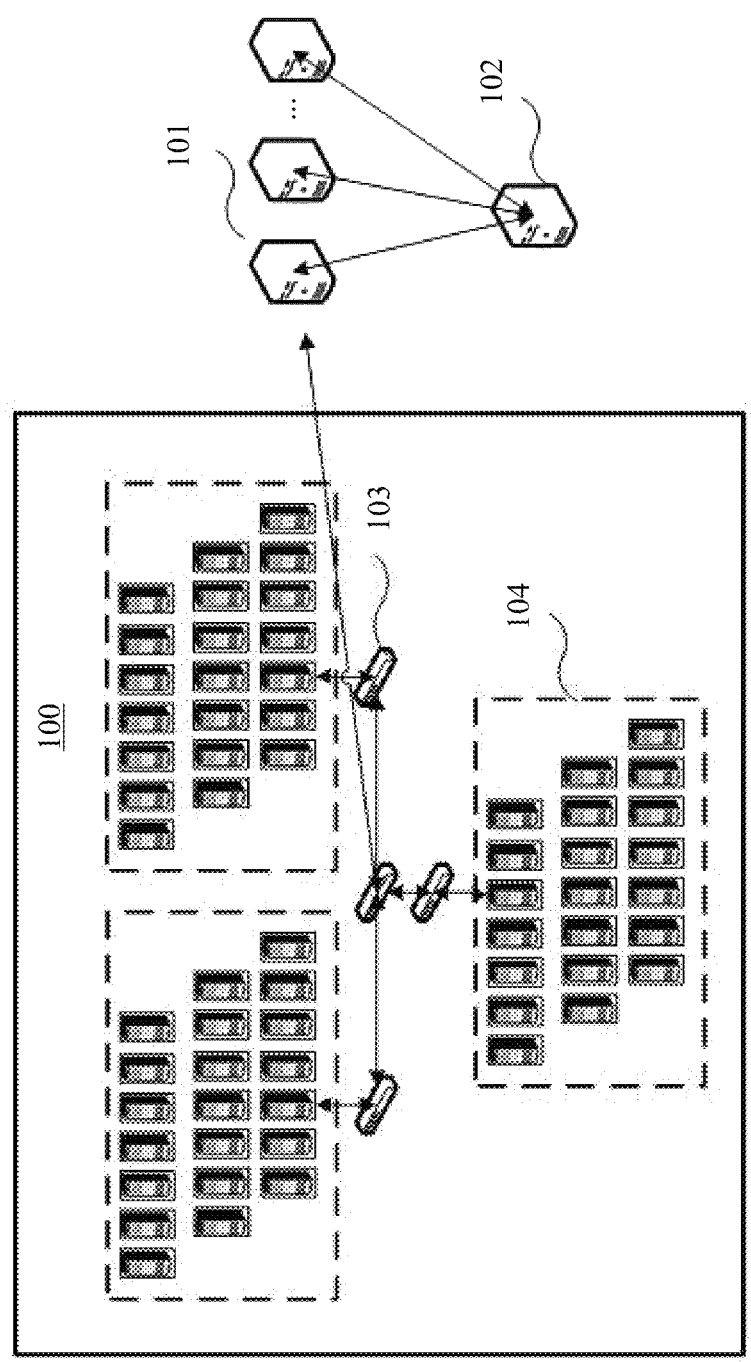
FIG. 1 is a schematic diagram of a scenario to which technical solutions of embodiments of this disclosure can be applied.

FIG. 1 is a schematic diagram of a scenario to which the technical solutions of the embodiments of this disclosure can be applied.

As shown in FIG. 1, a client server 101, an application server 102, and a storage system 100 communicate with each other. The storage system 100 includes a switch 103, a plurality of storage nodes (or referred to as a "node") 104, and the like. The storage node 104 may be also referred to as a node, and is a storage device. The switch 103 is an optional device. In another embodiment, the application server 102 may be inside the storage system 100.

Each node 104 may include a plurality of magnetic disks or a storage medium of another type (for example, a solid-state drive, a floppy disk, or shingled magnetic recording) to store data. For ease of description, only a hard disk drive (HDD) is used as an example subsequently. The nodes 104 may be classified into a data node, a parity node, and a metadata server based on specific functions. The data node is configured to store a data fragment of data, the parity node is configured to store a parity fragment of the data, and the metadata server may be configured to store metadata of the data, and may be further configured to store metadata of a data fragment and metadata of a metadata fragment.

The client server 101 sends a request to the application server 102, where the request includes to-be-written data. The application server 102 performs a division operation on the data to generate a data fragment, generates a parity fragment based on the data fragment, and returns the obtained fragments to the client server 101. The client server 101 sends, by using the switch 103, the fragments to nodes 104 that correspond to the fragments, and each of the nodes 104 returns a write success response to the client server 101 after storing the fragment.

It should be understood that the application server 102 and the client server 101 may be combined. For example, functions of the application server 102 and the client server 101 may be implemented by the client server 101. After combination, the function of the application server 102 is integrated into the client server 101, and an operation of information exchange between the application server 102 and the client server 101 may be converted into an internal operation, or some operations may be canceled.

In the distributed storage system 100, a distributed hash table (DHT) may be used for routing between the client server 101 and the nodes 104, but this is not limited in this embodiment of this disclosure. To be specific, in the technical solutions of the embodiments of this disclosure, various possible routing manners in the storage system may be used.

Figure 2:
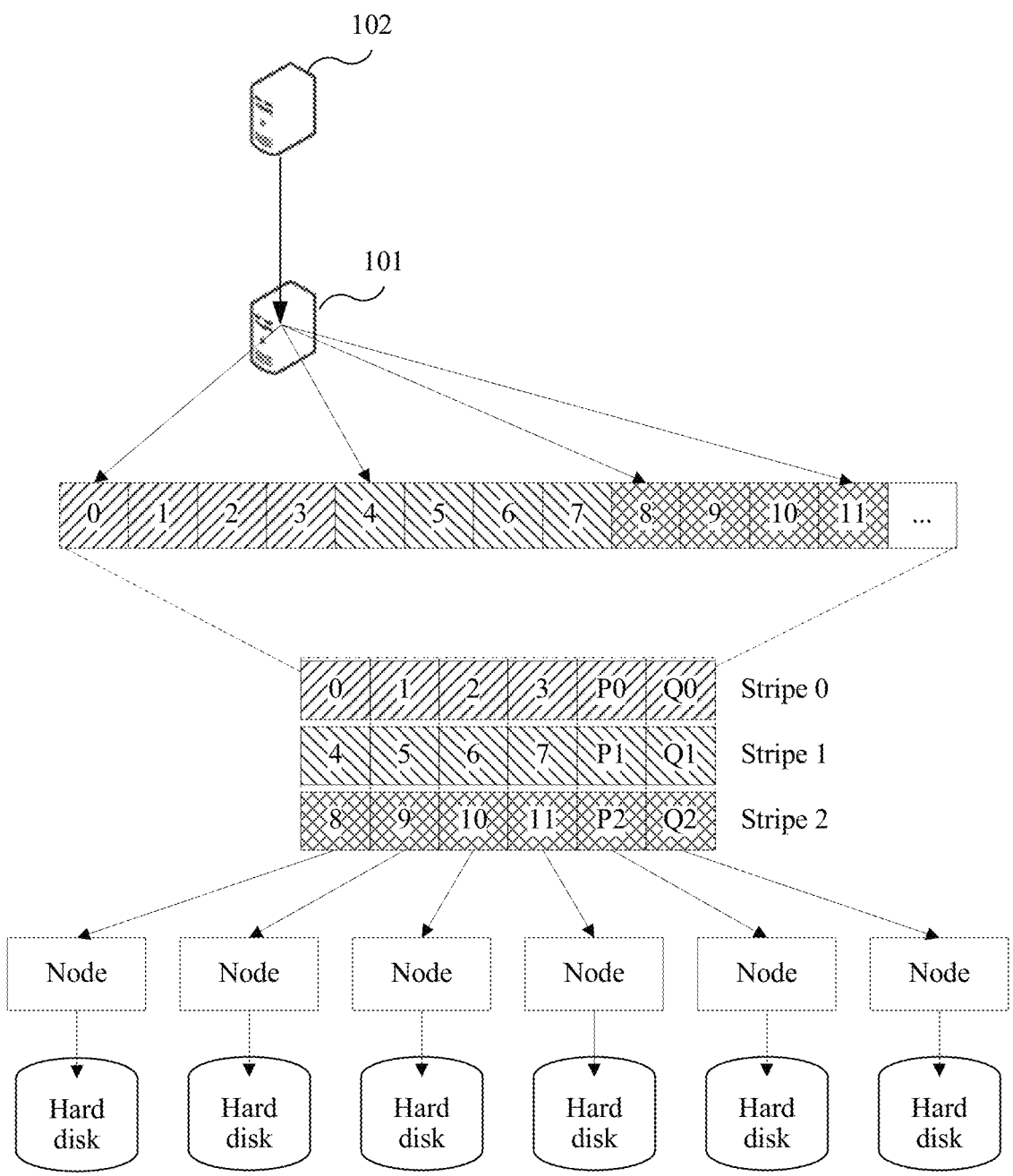
FIG. 2 is a schematic diagram of full-stripe data writing.
Figure 3:
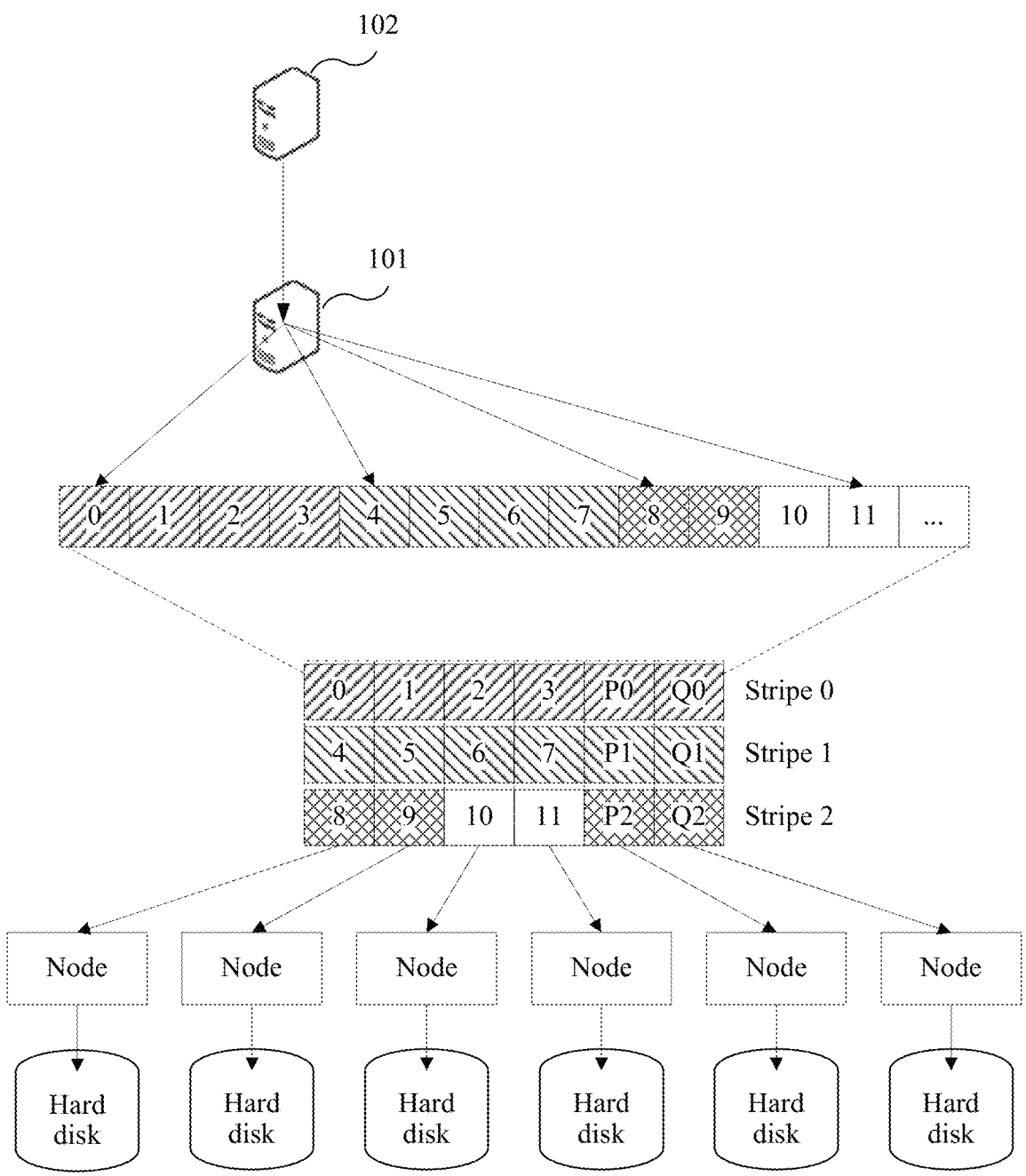
FIG. 3 is a schematic diagram of non-full-stripe data writing.

To ensure high reliability of data reading and writing, an erasure coding (EC) technology may be used in the distributed storage system 100 to store data. In this specification, an EC 4+2 mode is used as an example for description, that is, one stripe includes four data shards and two parity shards. However, this is not limited in this embodiment of this disclosure. A shard is sometimes referred to as a strip or a stripe unit. As shown in FIG. 2, if the EC 4+2 mode is used, the application server 102 divides data based on a size (for example, 512 KB) of a shard into four complete fragments each having the size of the shard (this case is referred to as meeting a full-stripe condition), and then obtains another two parity fragments through calculation by performing an exclusive OR operation. If the data does not meet the full-stripe condition, that is, a size of the data is insufficient to divide the data into four complete fragments, as shown in FIG. 3, a stripe 2 includes four data shards, and therefore may store four complete fragments in total, but the actual size of the data is only sufficient to divide the data into two complete fragments 8 and 9, a '0' filling operation needs to be performed to obtain fragments 10 and 11, that is, data in the two fragments is set to 0. Then, parity fragments P2 and Q2 are calculated by using the data fragments 10 and 11 generated through the '0' filling operation and the data fragments 8 and 9. The data fragments 10 and 11 obtained through the '0' filling operation do not include wanted information, but are still stored into data nodes, leading to a decrease in utilization of hard disk drive space.

For the foregoing problem, the embodiments of this disclosure provide a technical solution, to improve utilization of hard disk drive space when data does not meet a full-stripe condition, and reduce a total quantity of stripes needed by the data.

The following first describes some terms and parameters in the embodiments of this disclosure.

A stripe is a segment of logical space corresponding to physical space. Specifically, the stripe includes shards, and each shard corresponds to a segment of physical storage space on a hard disk drive. The correspondence is described by using a mapping relationship between a shard and a logical block address (LBA) of the hard disk drive, and the correspondence may be stored in a storage server or stored at another location. It should be particularly noted that for a thin provision (thin provision) technology, before data is really stored into a stripe, no physical space is allocated to the stripe, and the storage server allocates physical space (from the hard disk drive) to the stripe only when the storage server really needs to store a data fragment. After physical space corresponding to a shard stores a data fragment, it may be considered that the data fragment is "written" into the shard.

An EC mode/redundancy rate is represented as n+m, where n+m=N, n represents a quantity of data shards, m represents a quantity of parity shards, and N is a total quantity of shards of a stripe.

The n data shards of the stripe respectively correspond to n data nodes, the m parity shards respectively correspond to m parity nodes, the n data nodes are data nodes corresponding to the stripe, and the m parity nodes are parity nodes corresponding to the stripe. It should be noted that in this embodiment, N shards may correspond to N nodes, that is, each node stores only one fragment. In another embodiment, the N shards may correspond to less than N nodes provided that the N shards correspond to N storage media.

node_id represents a number of a server (node) with a hard disk drive in a specific stripe, and a value range of the node_id is [1, N], where 1 to n of the node_id represent IDs of data nodes, and n+1 to N of the node_id represent IDs of parity nodes. Certainly, in another embodiment, the node_id may not be used, and another label is used as an ID of a node.

A set of a mapping relationship <stripe_id, node_id> between a stripe and a node may be stored in a metadata server, and one node may correspond to a plurality of stripes.

client_id: represents a number of a client server. After a stripe is allocated to a client server, stripe_id_owner (described below) of the stripe is client_id of the client server. The client server writes data into the stripe, and another client server can only read data from the stripe but cannot write data into the stripe. The client_id is stored in the client server.

stripe_id: represents a number of a stripe and is stored in the metadata server. When data needs to be written, the metadata server allocates, to the client server, a stripe (stripe_id_owner is an invalid value) in which no data is written before.

stripe_full: represents that a stripe is full, a default value is FALSE (false), and the stripe_full is stored in the metadata server.

block_size: represents a configured/predetermined shard size, and a length thereof is fixed.

stripe_id_owner: represents a specific client server that writes data into a stripe, that is, an owner of the stripe. An initial value of the stripe_id_owner is set to an invalid value, and it indicates that the stripe is not allocated. The stripe_id_owner is stored in the metadata server.

offset: is an offset relative to a start location of a stripe, a minimum value of the offset is 0, and a maximum value of the offset may be block_size*n (n is a quantity of data shards in the EC mode).

location: is write location information and represents an end location of a written data fragment in a stripe. For example, the location may include an id of a node of the last data fragment that is written in a current round and an offset, and is represented as (node_id, offset).

Figure 4:
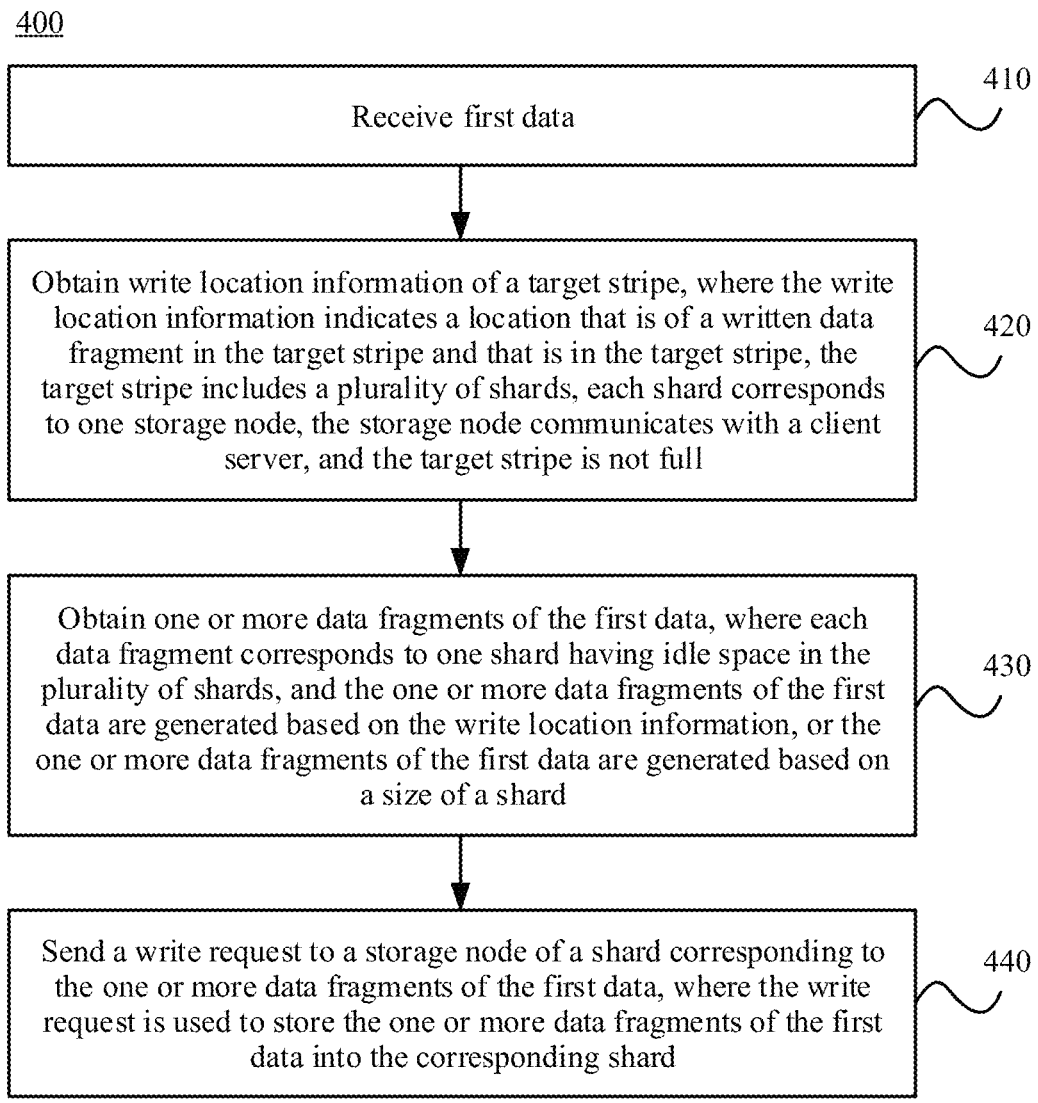
FIG. 4 is a schematic flowchart of a data writing method according to an embodiment of this disclosure.

FIG. 4 is a schematic flowchart of a data writing method 400 according to an embodiment of this disclosure.

A scenario to which the method 400 is applied includes a client server and a plurality of storage nodes. The plurality of storage nodes may include a data node and a parity node. For example, the method 400 may be applied to the scenario shown in FIG. 1, but this is not limited in this embodiment of this disclosure. The method 400 may be performed by the client server, for example, may be performed by the client server 101 in FIG. 1.

410. Receive first data.

The first data is to-be-written data, for example, data such as a file or an object that needs to be written. After receiving the first data, the client server prepares to write the first data into a corresponding stripe (a target stripe).

420. Obtain write location information of a target stripe, where the write location information indicates a location that is of a written data fragment in the target stripe, the target stripe includes a plurality of shards, each shard corresponds to one storage node, the storage node communicates with the client server, and the target stripe is not full.

In this embodiment of this disclosure, that "the stripe is not full" means that data has been written in the stripe, but the stripe includes space in idle mode (storing no data). In other words, data has been written in a part of the stripe, but space of the stripe is not full.

In this embodiment of this disclosure, the write location information indicates a location that is of the written data fragment in the stripe. In other words, the write location information may indicate a data writing status of the stripe. When the stripe is not full, the write location information may indicate a specific end location of written data in the stripe.

Optionally, in an embodiment of this disclosure, the write location information indicates an end location of the written data fragment in the stripe. For example, the write location information indicates a specific end node (shard) of written data in the stripe and a size of the written data.

Optionally, in an embodiment of this disclosure, the write location information may include information about a node in which a last data fragment written in the stripe is located and a size of the written data in the stripe.

Figure 5:
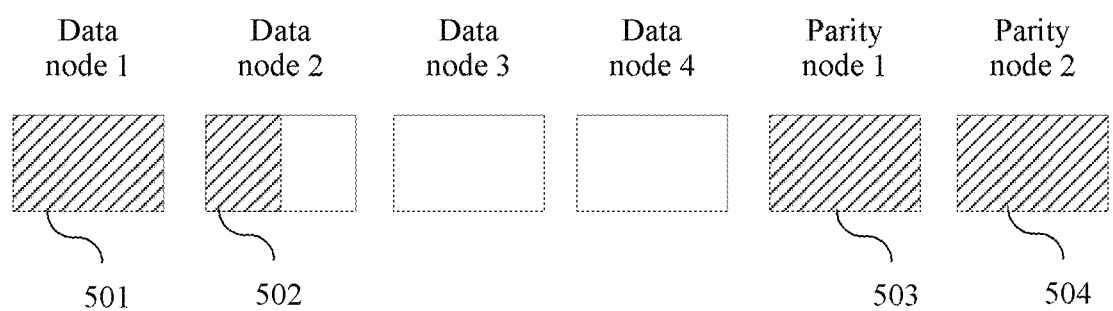
FIG. 5 is a schematic diagram of a data fragment according to an embodiment of this disclosure.

For example, as shown in FIG. 5, if 768 KB data has been written in the stripe, that is, a first data fragment (512 KB) is written in a data node 1, and a second data fragment (256 KB) is written in a data node 2, in this case, the write location information may be (2, 768 KB), where "2" indicates that a last written data fragment is located in the data node 2 (2 is node_id of the data node 2), 768 KB indicates that a size of the data written in the stripe is 768 KB, and the latter may be also referred to as an offset, that is, an offset of the written data relative to a start location of the stripe.

It should be understood that because a shard corresponds to a node, and a node number corresponds to a shard number, the write location information may further include an offset of the written data fragment in the target stripe and a number of a node of the written data fragment.

It should be understood that the write location information may be represented in another form, and this is not limited in this embodiment of this disclosure. For example, the offset may be changed to a size of data written in a last node in which data is written. Because a size of a shard is fixed, the size of the data written in the stripe can be obtained in this way. For example, if this form is used, after the second data fragment (256 KB) is written into the data node 2 in FIG. 5, the write location information may be represented as (2, 256 KB). Because a size of the data fragment written in the data node 1 is fixed and is 512 KB (that is, the size of the shard), it can be learned, based on the write location information, that the size of the data written in the stripe is 768 KB.

Optionally, the write location information may be stored in a memory of the client server, or may be stored in another node, for example, may be stored in a metadata server.

Optionally, when the write location information is stored in the memory of the client server, the client server may directly obtain the write location information stored in the memory of the client server.

Optionally, when the write location information is stored in the metadata server, the client server may obtain the write location information from the metadata server.

430. Obtain one or more data fragments of the first data, where each data fragment corresponds to one shard having idle space in the plurality of shards, and the one or more data fragments of the first data are generated based on the write location information, or the one or more data fragments of the first data are generated based on a size of a shard.

In this embodiment of this disclosure, the data fragment of the first data is generated through a division operation, and the data fragment is written into a corresponding data shard. When an application server is disposed, the division operation may be performed by the application server. When no application server is disposed, for example, when an application server is integrated with the client server, the division operation may be performed by the client server.

Optionally, in an embodiment of this disclosure, the client server divides the first data to generate the one or more data fragments of the first data.

Optionally, in another embodiment of this disclosure, when the application server performs the division operation, the client server may send the write location information and the first data to the application server, and then obtain the one or more data fragments of the first data from the application server.

Optionally, in an embodiment of this disclosure, that the one or more data fragments of the first data are generated based on the write location information may specifically include one of the following cases:

When the end location of the written data fragment in the target stripe is an end location of a particular shard, the first data is divided based on a size of the shard (for example, 512 KB described above), to generate the one or more data fragments of the first data, and if a size of the first data is less than the size of the shard, the first data is used as one data fragment.

When the end location of the written data fragment in the target stripe is not the end location of the particular shard (for example, is a location in the middle of the particular shard), one data fragment is divided from the first data based on a size of a portion that is of the particular shard and in which no data is written, and the data fragment obtained through division corresponds to the portion that is of the particular shard and in which no data is written, so that the data fragment and an existing data fragment in the particular shard fill up the particular shard together. Then, a remaining part of the first data is divided based on the size of the shard, and each data fragment divided from the remaining part of the first data corresponds to one empty shard. If the size of the first data is less than the size of the portion that is of the particular shard and in which no data is written, the first data is used as one data fragment.

Specifically, if the end location of the written data fragment in the target stripe is the end location of the particular shard, a process of writing data (the first data) that is to be written in a current round starts from a start location of a next shard, the first data is divided based on a size of the shard, and the last to-be-written data that does not meet a size of one shard is used as the last data fragment. If the size of the first data is less than the size of the shard, the entire first data is used as one data fragment, so as to obtain the data fragment of the first data.

If the end location of the written data fragment in the stripe is not the end location of the particular shard, the process of writing the data (the first data) that is to be written in the current round does not start from a start location of a shard. First, one fragment needs to be obtained through division by performing a division operation, so that the fragment and a fragment that is written in the particular shard make up one shard. Then, division is performed based on the size of the shard. If the size of the first data is less than the size of the portion that is of the particular shard and in which no data is written, the entire first data is used as one data fragment, so as to obtain the data fragment of the first data.

Figure 6:
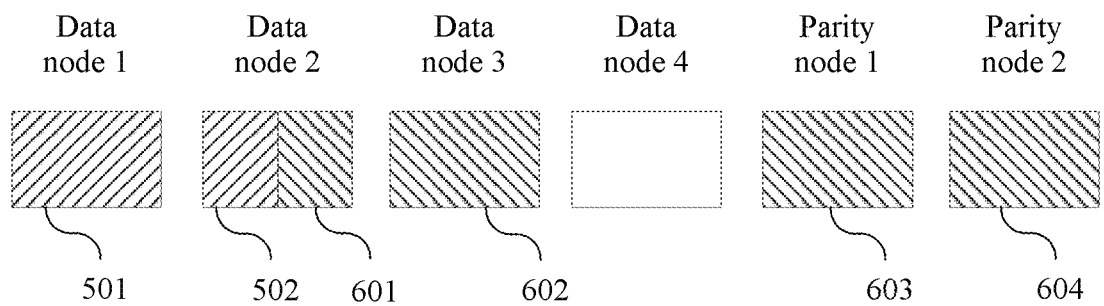
FIG. 6 is a schematic diagram of a data fragment according to another embodiment of this disclosure.

For example, as shown in FIG. 6, 768 KB data has been written in the stripe, and other 768 KB data needs to be written in the current round. It may be determined, based on the write location information (2, 768 K), that the end location of the written data fragment is in the data node 2 (corresponding to a data shard 2), and is not an end location of the data shard 2. Then, one data fragment 601 is obtained through division based on a size 256 KB of a portion that is of the data shard 2 and in which no data is written, and then division is performed based on the size 512 KB of the shard, to obtain one 256 KB data shard 601 and one 512 KB data shard 602 of the data to be written in the current round.

The one or more data fragments of the first data are generated based on the write location information, so that the generated data fragment can correspond to the portion that is of the target stripe and in which no data is written, and the data fragment can be written into the portion that is of the target stripe and in which no data is written. Therefore, compared with the prior art, overheads of hard disk drive space are reduced, and a total quantity of stripes needed by data is reduced.

Optionally, in an embodiment of this disclosure, the one or more data fragments of the first data are generated based on the size of the shard.

Specifically, in this embodiment, regardless of whether the end location of the written data fragment in the target stripe is the end location of the particular shard, the first data is divided based on the size of the shard to generate the one or more data fragments of the first data, and if the size of the first data is less than the size of the shard, the first data is used as one data fragment. Each data fragment of the first data corresponds to one empty shard. Correspondingly, a process of writing the data (the first data) that is to be written in the current round starts from a start location of a next shard.

Optionally, there are two division manners for selection: When the first data meets a first condition, the one or more data fragments of the first data are generated based on the write location information, or when the first data meets a second condition, the one or more data fragments of the first data are generated based on the size of the shard. For example, which one of the foregoing two division manners is to be used may be determined based on the size of the first data. For example, when the size of the first data is less than a predetermined threshold (for example, the size of the shard is used as the predetermined threshold), the first division manner may be used, that is, the one or more data fragments of the first data are generated based on the write location information; or when the size of the first data is not less than the predetermined threshold, the second division manner may be used, that is, the one or more data fragments of the first data are generated based on the size of the shard. Alternatively, a division manner may be selected based on a file type of the first data. For example, if the first data is a log file, the first division manner is used, or if the first data is a video file, the second division manner is used. Optionally, a division manner may be alternatively selected based on QoS of the first data. For example, if the first data has a low delay requirement, the first division manner is used, or if the first data has a high delay requirement, the second division manner is used.

440. Send a write request to a storage node of a shard corresponding to the one or more data fragments of the first data, where the write request is used to store the one or more data fragments of the first data into the corresponding shard.

After obtaining the data fragment of the first data in the foregoing step, the client server writes the data fragment of the first data into the corresponding data shard. Because the shard corresponds to storage space of the storage node, a process of writing the data (which is specifically the data fragment) into the data shard may be considered as a process of storing the data into the storage node. The client server sends the write request to the storage node of the shard corresponding to each data fragment, and the write request may include information such as a to-be-written data fragment, and numbers of a stripe and a node (or a shard). After receiving the write request, the storage node stores the data fragment into the corresponding shard.

It should be understood that a process in which the client server sends the write request to the storage node and the storage node stores the data based on the write request may be referred to as a process in which the client server writes the data, that is, may be referred to as a process in which the client server writes the fragment into the node.

Optionally, in an embodiment of this disclosure, the client server may write the data fragment of the first data into the corresponding data node in an appending manner.

Specifically, the end location of the written data fragment in the stripe may be determined based on the write location information, and the client server may continue to write a data fragment into a location after the location in an appending (append) manner.

When data is written into an unused strip for the first time, because data writing starts from a start location of a shard, a case in which the stripe includes data may not need to be considered, and to-be-written data is directly divided based on a size of the shard. An example in which second data is written into an unused strip is used, and a corresponding process may be as follows:

The client server receives the second data; obtains an unused stripe as the target stripe, where a size of the second data is less than a size of the target stripe; obtains at least one data fragment of the second data, where the data fragment of the second data is generated based on the size of the shard; determines a shard corresponding to the data fragment of the second data; writes the data fragment of the second data into the corresponding shard; and records a write location of the data fragment of the second data in the target stripe as the write location information.

For example, as shown in FIG. 5, the to-be-written data (the second data) is written into the unused strip, the size of the shard is 512 KB, the size of the to-be-written data is 768 KB, and a process of writing the to-be-written data starts from a start location of the first data shard. Therefore, the to-be-written data is divided based on the size 512 KB of the shard to obtain one 512 KB data fragment 501 and one 256 KB data fragment 502. Then, the client server starts data writing from a start location of the stripe, that is, writes the data fragment 501 into the first shard of the stripe and writes the data fragment 502 into the second shard of the stripe, and may record write location information (2, 768 KB).

In this embodiment of this disclosure, for a parity fragment, the parity fragment may be stored into a node each time a data fragment is stored into the node; alternatively, the parity fragment may not be stored when the stripe is not full, and the parity fragment is stored into the node after the stripe is full. The following separately provides descriptions.

Optionally, in an embodiment of this disclosure, a parity fragment is stored each time a data fragment is stored. In this case, the client server further obtains a parity fragment of the stripe and writes the parity fragment of the stripe into a parity node corresponding to the stripe.

For the parity fragment, a new parity fragment may be generated based on a new data fragment that is generated in a current round and a parity fragment, generated in a previous round in the stripe. For example, for a particular stripe, an exclusive OR operation (during the exclusive OR operation, an empty part is filled up with 0s) is performed on the new data fragment that is generated in the current round and the parity fragment, generated in the previous round in the stripe, and an exclusive OR operation result is used as the new parity fragment. If no data fragment has been written in the stripe before the data fragment generated in the current round is written into the stripe, the parity fragment is generated based only on the data fragment generated in the current round. For example the data fragment generated in the current round is filled up with 0s, and then the parity fragment is generated based on an EC algorithm. A main purpose of 0-filling can be to calculate the parity fragment, and the added 0s are not sent to a node for storage.

Optionally, the target stripe includes the parity fragment of the written data fragment, and after obtaining at least one data fragment of the first data, the client server may further calculate a common parity fragment of the written data fragment and the one or more data fragments based on the one or more data fragments and the parity fragment of the written data fragment, and store the calculated parity fragment into a parity shard of the target stripe.

Optionally, when the client server performs the division operation, the client server generates the new parity fragment based on the data fragment of the first data and a parity fragment that has been written in the stripe.

Optionally, when the application server performs the division operation, the application server generates the new parity fragment based on the data fragment of the first data and a parity fragment that has been written in the stripe, and sends the new parity fragment to the client server.

For example, during storage of the data shown in FIG. 5, an exclusive OR operation may be performed based on the 512 KB data fragment 501 and the 256 KB data fragment 502 to obtain a parity fragment 503 and a parity fragment 504. During storage of data shown in FIG. 6, an exclusive OR operation may be performed based on the newly generated 256 KB data fragment 601, the newly generated 512 KB data fragment 602, and the parity fragments 503 and 504 that are generated during previous data storage, to obtain two new parity fragments 603 and 604.

After obtaining the data fragments 601 and 602 and the parity fragments 603 and 604 of the first data, the client server separately writes the data fragments and the parity fragments of the first data into corresponding data nodes and parity nodes.

Optionally, the metadata server may store a mapping relationship between a stripe and a node, and send, to the client server, information about the stripe and information about a data node and a parity node that correspond to the stripe.

For example, the metadata server may store a mapping relationship between stripe_id of a stripe and node_id of a node, and store an identifier of a client server (stripe_id_owner) that writes data into a stripe. When writing data into a new stripe, the client server queries the metadata server for stripe_id of the stripe into which data needs to be written and a mapping relationship between the stripe and a node. The metadata server may select a stripe whose stripe_id_owner has an invalid value, allocate the stripe to the client server for data writing, and update the value of the stripe_id_owner to a number client_id of the client server. An initial value of the stripe_id_owner is an invalid value, and it indicates that the stripe is not allocated. The metadata server sends stripe_id of the allocated stripe and corresponding node_id to the client server. The client server may learn of, based on this, the allocated stripe and a data node and a parity node that correspond to the stripe.

For example, during storage of the data shown in FIG. 5, because no data is written in a stripe, the write location information is (1, 0 KB), or the write location information is empty, or there is no write location information in this case. The client server starts data writing from a start location of the stripe, that is, writes the data fragment 501 into a data node 1 corresponding to the stripe and writes the data fragment 502 into a data node 2 corresponding to the stripe. It is assumed that a value of stripe_id of the stripe is 5. For the data fragment 501, the client server may send a data write request, where the data write request includes the data fragment 501 and includes a parameter (stripe_id 5, node_id 1, offset 0 KB, length 512 KB), the stripe_id 5 indicates that the data write request comes from a stripe 5, the node_id 1 represents the data node 1 of the stripe, the offset 0 KB indicates that an offset of a write location relative to the start location of the stripe is 0 KB, that is, data writing starts from the start location of the stripe, and the length 512 KB indicates that a size of to-be-written data is 512 KB. The data node 1 persists the data fragment 501 to a hard disk drive based on the data write request, and then returns a write success response to the client server. Similarly, for the data fragment 502, the client server may send a data write request, where the data write request includes the data fragment 502 and includes a parameter (stripe_id 5, node_id 2, offset 512 KB, length 256 KB). The data node 2 persists the data fragment 502 to a hard disk drive based on the data write request, and returns a write success response to the client server. In addition, the client server respectively sends the parity fragment 503 and the parity fragment 504 to a parity node 1 and a parity node 2, and the parity node 1 and the parity node 2 respectively persist the parity fragment 503 and the parity fragment 504 to hard disk drives, and return write success responses to the client server. Persisting a fragment to a hard disk drive is actually storing the fragment into the hard disk drive, and a process of storing a fragment is essentially a process of persisting the fragment.

Optionally, when the write location information is stored in the memory of the client server, after writing the data fragment of the first data into the corresponding data node, the client server updates the write location information stored in the memory of the client server. Optionally, the write success response returned by each data node may include an end location of the written data fragment in the data node, or each data node sends an end location of the written data fragment in the data node to the client server when returning the write success response. The client server may compare the end locations of the written data fragments in the data nodes, to determine the end location of the written data fragment in the stripe, and further update the write location information stored in the memory of the client server.

For example, when storage of the data shown in FIG. 5 is completed, the client server may determine, as the end location of the written data fragment in the stripe, the end location that is of the written data fragment and that is returned by the data node 2, to update the write location information stored in the memory of the client server to (2, 768 KB).

Optionally, in another embodiment of this disclosure, when the write location information is stored in the metadata server, after the data fragment of the first data is written into the corresponding data node, the metadata server updates the write location information. Optionally, after each data node successfully persists the data fragment, the data node may further send the end location of the written data fragment in the data node to the metadata server. The metadata server may compare the end locations of the written data fragments in the data nodes, to determine the end location of the written data fragment in the stripe, and further update the write location information stored in the metadata server.

For example, when storage of the data shown in FIG. 5 is completed, the metadata server may determine, based on the end locations that are of the written data fragments and that are returned by the data nodes 1 and 2, that the end location that is of the written data fragment and that is returned by the data node 2 is the end location of the written data fragment in the stripe, and therefore, may update the write location information stored in the metadata server to (2, 768 KB).

After storage of the data shown in FIG. 5 is completed, as shown in FIG. 6, in a next-round data writing process, the new data fragments 601 and 602 and parity fragments 603 and 604 are generated based on the write location information. The client server determines, based on the write location information, to start data writing from (2, 768 KB). Therefore, the client server sends the data fragment 601 to the data node 2 and sends the data fragment 602 to a data node 3, and the data node 2 and the data node 3 respectively persist the data fragment 601 and the data fragment 602 to hard disk drives, and return write success responses to the client server.

Optionally, for a stripe in which a data fragment of an I/O request is written, a data fragment of a new I/O request may be written in an append-only manner. In the append-only manner, a start location of a subsequently written data fragment is an end location of a data fragment that is successfully written previously. In such data fragment writing manner, on one hand, hard disk drive space can be efficiently used as far as possible, to avoid occurrence of idle space between data; on the other hand, a flash storage medium can be better adapted to, to improve reading and writing performance, implement wear leveling, and increase a service life of the medium such as a solid state drive (SSD) or a storage class memory (SCM).

In addition, the client server respectively sends the parity fragment 603 and the parity fragment 604 to the parity node 1 and the parity node 2, and the parity node 1 and the parity node 2 respectively persist the parity fragment 603 and the parity fragment 604 to the hard disk drives of the parity node 1 and the parity node 2, and return write success responses to the client server.

After storage of the data shown in FIG. 6 is completed, the end location of the written data fragment in the stripe is an end location of the data node 3 or a start location of a data node 4. Therefore, the write location information may be updated to (3, 1536 KB) or (4, 1536 KB).

When the stripe is not full, the foregoing process may be cyclically performed, or when the stripe is full, the stripe may be marked as full in the metadata server, to complete one full-stripe data writing process.

For example, when the client server updates the write location information, after updating the write location information, if the client server determines that the stripe is full, the client server may send, to the metadata server, indication information indicating that the stripe is full, and the metadata server marks the stripe as full according to the indication information, for example, sets a fullness flag stripe_full of the stripe to TRUE.

When the metadata server updates the write location information, after the metadata server updates the write location information, if the metadata server determines that the stripe is full, the metadata server marks the stripe as full, for example, sets a fullness flag of the stripe to TRUE. The metadata server may further send, to the client server, indication information indicating that the stripe is full. In this way, the client server may no longer write new data into the stripe that is full, and continues to write data into a next stripe.

Optionally, in another embodiment of this disclosure, when the stripe is not full, a parity fragment is not stored into a node; instead, a parity fragment obtained in each round is stored into a buffer, and a final parity fragment is stored into the node when the stripe is full.

In this embodiment, the buffer of the client server includes a parity fragment of the data fragment that is written in the node. After obtaining the at least one data fragment of the first data, the client server may further calculate the common parity fragment of the written data fragment and the one or more data fragments based on (1) the one or more data fragments and (2) the parity fragment of the written data fragment, and store the calculated parity fragment into the buffer of the client server. After all data shards of the target stripe are full of data fragments (that is, "full-stripe writing"), the parity fragment that corresponds to the target stripe and that is in the buffer of the client server is stored into the parity shard of the target stripe.

In this embodiment, except that the parity fragment is stored into the buffer when the stripe is not full, other processing is similar to that in the foregoing embodiment. For details, refer to the corresponding descriptions in the foregoing embodiment. For brevity, details are not described herein again.

Optionally, in another embodiment of this disclosure, when the stripe is not full, no parity fragment is calculated or stored, and a parity shard is calculated and stored when the stripe is full.

In this embodiment, the storage node includes a parity node used to store a parity fragment. In addition to sending the write request, the client server further sends the one or more data fragments to one or more parity nodes for backup, and after all data shards of the target stripe are full of data fragments, instructs the one or more parity nodes to generate a parity fragment based on all data fragments of the target stripe that are backed up, and store the generated parity fragment into the parity shard of the target stripe.

In this embodiment, in addition to writing the data fragment of the first data into the data node, the client server sends the data fragment of the first data to a parity node corresponding to the stripe for backup, and when the stripe is full, sends, to the parity node, indication information indicating that the stripe is full, where the indication information is used to instruct the parity node to generate and store the parity fragment of the stripe based on all data fragments of the stripe.

In this embodiment, except the following description, other processing, for example, the client server writes the data fragment of the first data into the data node and the write location information is used and updated, is similar to that in the foregoing embodiment. For details, refer to the corresponding descriptions in the foregoing embodiment. For brevity, details are not described herein again.

After writing the data fragment of the first data into the data node, the client server further sends the data fragment of the first data to the parity node corresponding to the stripe. The parity node buffers the data fragment. When the stripe is not full, the client server may continue to store a next round of data (for example, to-be-written data included in a next write I/O request from a host) in a similar manner. When the stripe is full, the client server sends, to the parity node, the indication information indicating that the stripe is full. After receiving the indication information, the parity node generates and stores the parity fragment of the stripe based on all data fragments of the stripe. Then, the parity node may delete all buffered data fragments of the stripe, and may return, to the client server, a response indicating that the parity fragment is successfully written.

A manner in which the client server determines whether the stripe is full is similar to that in the foregoing embodiment. For example, during updating of the write location information, after updating the write location information, the client server may determine whether the stripe is full. During updating of the write location information, after updating the write location information, if the metadata server determines that the stripe is full, the metadata server may send, to the client server, indication information indicating that the stripe is full, and the client server may determine, based on whether the indication information is received, whether the stripe is full.

In the technical solution of this embodiment of this disclosure, a data fragment of data is written based on write location information, and when the data does not meet a full stripe, no '0' filling operation needs to be performed, so that overheads of hard disk drive space can be reduced, and a total quantity of stripes needed by the data can be reduced. Therefore, (1) stripe management is simpler and more convenient, and stripe management complexity is reduced, (2) a speed of searching for a stripe is increased, and when a stripe needs to be searched for, the needed stripe can be found more quickly, (3) a quantity of stripes needing to be recovered from a fault is reduced, and a fault rectification speed is increased. For example, when a hard disk drive is faulty, data recovery needs to be performed on all stripes involved in the faulty hard disk drive, and when a total quantity of stripes is decreased, a quantity of stripes needing to be recovered is decreased, and recovery time is shortened.

In addition, in the technical solution of this embodiment of this disclosure, because '0' filling data is not needed, transmission and persistency of the '0' filling data are avoided, write amplification and an operation of migrating invalid data are reduced, and storage efficiency of the storage system can be improved.

The following describes in detail the embodiments of this disclosure with reference to specific examples. It should be noted that the examples are merely used to help a person skilled in the art to better understand the embodiments of this disclosure, but are not used to limit the scope of the embodiments of this disclosure.

Figure 7:
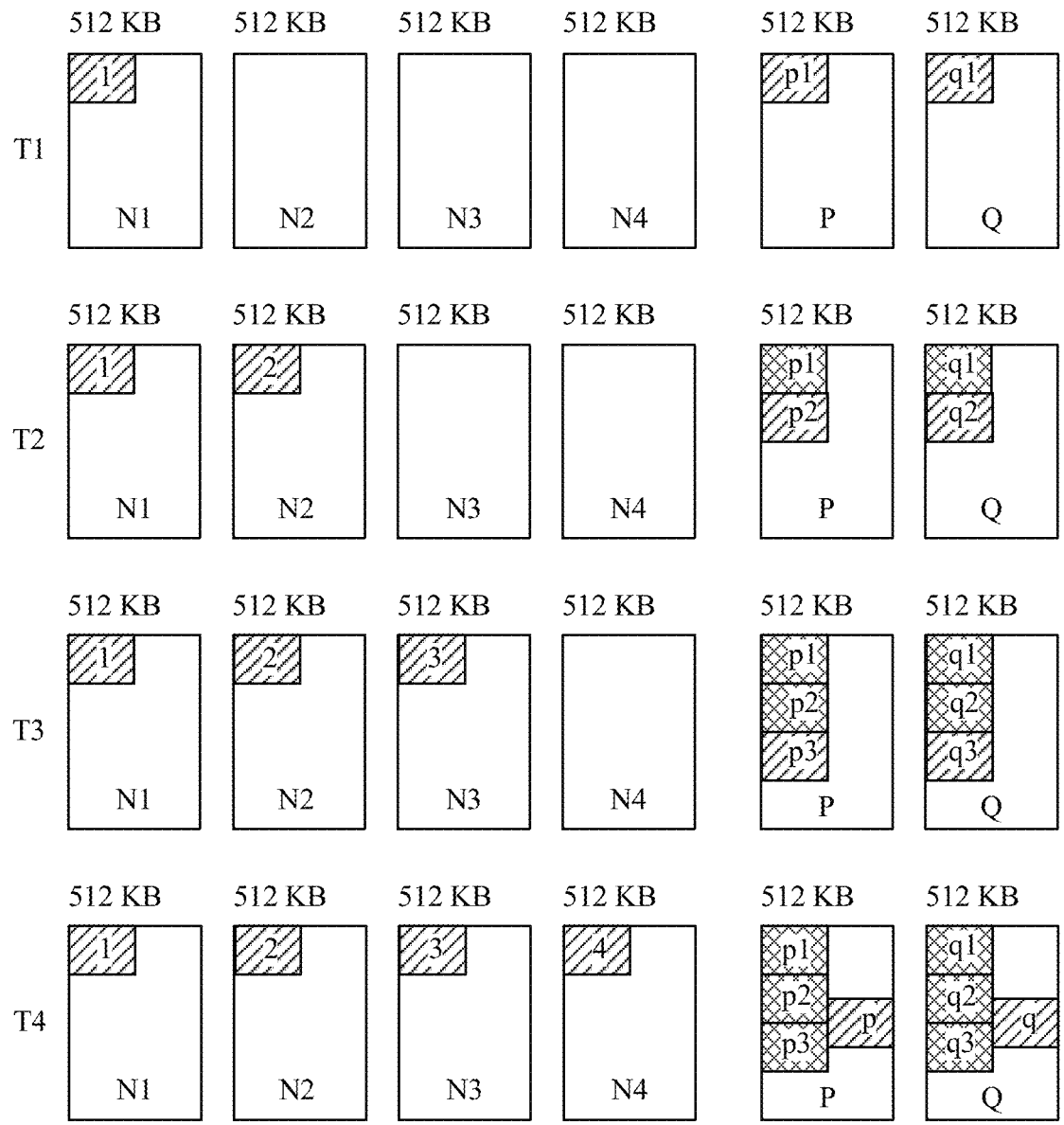
FIG. 7 is a schematic diagram of a data writing manner according to an embodiment of this disclosure.

FIG. 7 is a schematic diagram of a data writing manner according to an embodiment of this disclosure.

In FIG. 7, T1 to T4 represent a timeline. An EC 4+2 mode is used as an example. A size of a shard is 512 KB, N1 to N4 represent nodes in which data shards are located, and P and Q represent nodes in which parity shards are located. Write location information is stored in a metadata server (not shown in the figure), and a case in which write location information is stored in a client server is similar thereto. For brevity, details are not described herein again.

A data fragment 1 needs to be written at a moment T1, data fragments 2, 3, and 4 are all replaced with '0', parity fragments p1 and q1 are calculated by using the data fragments 1, 2, 3, and 4. Then, specified nodes are addressed by using routing information (for example, in a DHT manner), the data fragment 1 and the parity fragments p1 and q1 are persisted to hard disk drives (the data fragments 2, 3, and 4 do not need to be persisted), and an end location of the data fragment that is written at this moment is updated to the metadata server.

The data fragment 2 needs to be written at a moment T2. A location into which the data fragment 2 is written is obtained by querying the metadata server. Parity fragments p2 and q2 are calculated by using the data fragment 2 and the parity fragments p1 and q1, the data fragment 2 and the parity fragments p2 and q2 are persisted to hard disk drives, an end location of the data fragment that is written at this moment is updated to the metadata server, and then p1 and q1 are deleted.

The data fragment 3 needs to be written at a moment T3. A location into which the data fragment 3 is written is obtained by querying the metadata server. Parity fragments p3 and q3 are calculated by using the data fragment 3 and the parity fragments p2 and q2, the data fragment 3 and the parity fragments p3 and q3 are persisted to hard disk drives, an end location of the data fragment that is written at this moment is updated to the metadata server, and then p2 and q2 are deleted.

The data fragment 4 needs to be written at a moment T4. In this case, a full-stripe writing condition is met (a total size of the data fragments=512 KB*4=a total size of shards storing the data fragments). Final parity fragments p and q are calculated by using the data fragment 4 and the parity fragments p3 and q3, and are persisted. Then, p3 and q3 are deleted, and the stripe is marked as completing a full-stripe writing process. Till now, one full-stripe data writing process ends. The data fragments 1, 2, 3, and 4 may separately come from different data write requests of a host. For a subsequent data writing process, steps at T1 to T4 may be repeated.

Figure 8A:
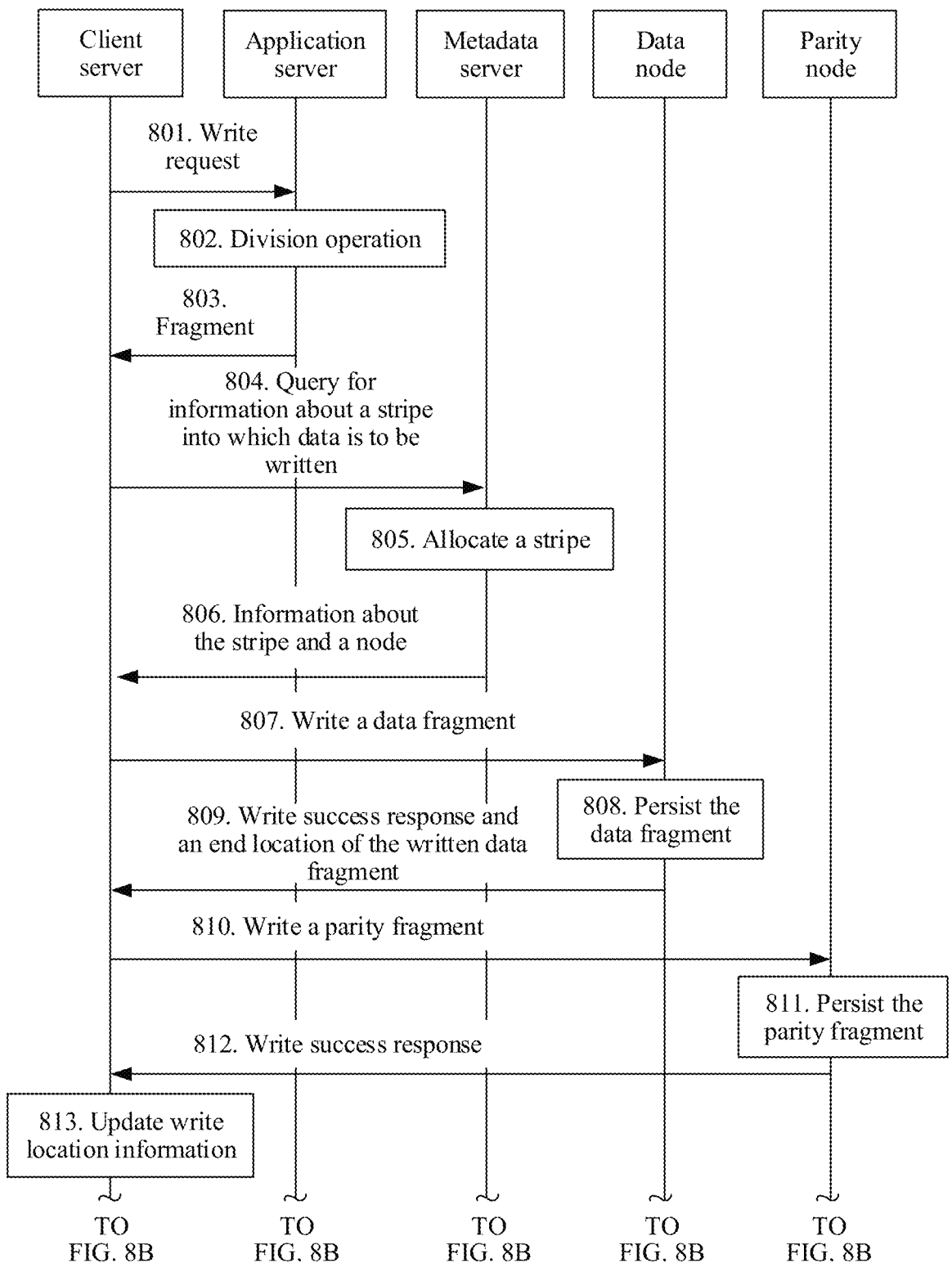
FIG. 8A and FIG. 8B are a flowchart of a data writing method according to an embodiment of this disclosure.
Figure 8B:
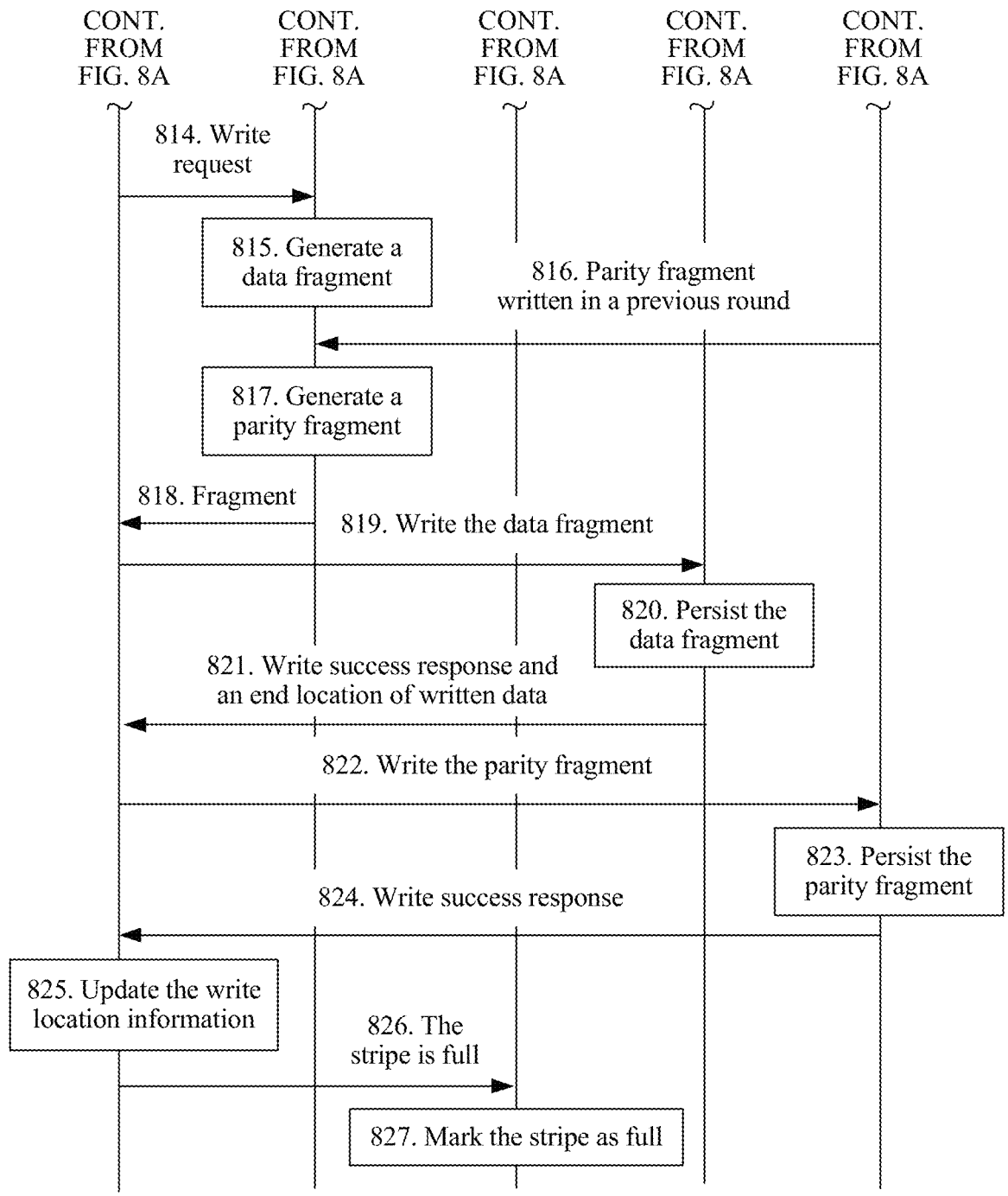

FIG. 8A and FIG. 8B are a flowchart of a data writing method according to an embodiment of this disclosure.

In FIG. 8A and FIG. 8B, a storage system includes a client server, an application server, a metadata server, a data node, and a parity node. The data node and the parity node may respectively store a data fragment and a parity fragment according to an EC mode. In FIG. 8A and FIG. 8B, quantities of data nodes and parity nodes corresponding to a stripe depend on a used EC mode. For example, for an EC 4+2 mode, one stripe corresponds to four data nodes and two parity nodes. In FIG. 8A and FIG. 8B, write location information is stored in a memory of the client server.

It should be understood that when an application server and a client server are combined, a corresponding function of the application server may be implemented by the client server. For brevity, details are not described herein.

The following steps 801 to 813 describe how the client server persists first data included in a first I/O request to a node, and the following steps 814 to 825 describe how the client server persists second data included in a second I/O request to a node. The I/O request is, for example, a write I/O request received from a host or another device, or a write I/O request generated by the client server itself.

801. The client server sends a data write request to the application server.

When needing to store data (the first data), the client server sends the data write request to the application server, where the data write request includes the to-be-written data, for example, data such as a file or an object that needs to be written.

802. The application server performs a division operation.

After receiving the data write request of the client server, the application server performs the division operation on the to-be-written data based on a configured EC redundancy rate and shard size, and calculates a parity fragment. Because there is no write location information in this case, the application server may perform a fragment division operation based on the configured shard size.

803. The application server returns a data fragment and a parity fragment to the client server.

804. The client server queries the metadata server for information about a stripe into which data is to be written.

The client server queries the metadata server for stripe_id of the stripe into which the data needs to be written and a mapping relationship between the stripe and a node.

805. The metadata server allocates a stripe.

The metadata server may randomly select a stripe whose stripe_id_owner has an invalid value, allocate the stripe to the client server for data writing, and update the value of the stripe_id_owner to a number client_id of the client server. That the stripe_id_owner is an invalid value means that the stripe is an empty stripe, and no data fragment is stored in the stripe. Therefore, there is no write location information (or a value of write location information is 0, or a value of write location information is an invalid value).

806. The metadata server sends information about the allocated stripe and a corresponding node to the client server.

For example, the metadata server may send stripe_id of the allocated stripe and corresponding node_id to the client server.

807. The client server writes the data fragment.

Because there is no write location information in this case, the client server starts data writing from a start location of the allocated stripe. The client server sends the data fragment to a corresponding data node.

808. A data node persists the data fragment.

The corresponding data node that receives the data fragment persists the data fragment to a hard disk drive.

809. The data node sends a write success response and an end location of the written data fragment to the client server.

After successfully persisting the data fragment sent by the client server, the data node returns the write success response to the client server. The response may include the end location of the written data fragment in the data node, or the data node sends the end location of the written data fragment in the data node to the client server when returning the write success response.

810. The client server writes the parity fragment.

The client server sends the parity fragment to a corresponding parity node.

811. A parity node persists the parity fragment.

The parity node persists the parity fragment to a hard disk drive.

812. The parity node sends a write success response to the client server.

After the client server receives the responses indicating that the data fragment and the parity fragment are successfully written in a current round, current-round data writing succeeds.

813. The client server records write location information.

The client server may compare end locations of written data fragments in data nodes, to determine an end location of the written data fragment in the stripe, and record write location information in the memory of the client server (if the value of the write location information is 0 or an invalid value, "recording" in this step may be understood as "updating").

814. The client server sends a data write request to the application server.

When new data (second data) needs to be stored, the client server sends the data write request to the application server, where the data write request includes the to-be-written data and the write location information. The write location information represents the end location of the data fragment that is written into the stripe in a previous round.

815. The application server generates a data fragment.

After receiving the data write request of the client server, the application server generates the data fragment of the to-be-written data based on the write location information. For a specific generation manner, refer to the foregoing embodiment. For brevity, details are not described herein again.

816. The application server reads the parity fragment that is written into the stripe in a previous round.

817. The application server generates a parity fragment.

The application server generates the new parity fragment based on the new data fragment that is generated in the current round and the parity fragment that is written into the stripe in the previous round.

818. The application server returns the data fragment and the parity fragment to the client server.

819. The client server writes the data fragment.

The client server starts, based on the write location information, data writing from the end location of the data fragment that is written into the stripe in the previous round. The client server sends the data fragment to a corresponding data node.

820. A data node persists the data fragment.

The data node that receives the data fragment persists the data fragment to a hard disk drive. For example, the new data fragment may continue to be written in an append-only manner.

821. The data node sends a write success response and an end location of the written data fragment to the client server.

After successfully persisting the data fragment sent by the client server, the data node returns the write success response to the client server. The response may include the end location of the written data fragment in the data node, or the data node sends the end location of the written data fragment in the data node to the client server when returning the write success response.

822. The client server writes the parity fragment.

The client server sends the parity fragment to a corresponding parity node.

823. A parity node persists the parity fragment.

The parity node persists the parity fragment to a hard disk drive.

824. The parity node sends a write success response to the client server.

After the client server receives the responses indicating that the data fragment and the parity fragment are successfully written in the current round, current-round data writing succeeds.

825. The client server updates the write location information.

The client server may compare end locations of written data fragments in data nodes, to determine an end location of the written data fragment in the stripe, and further update the write location information stored in the memory of the client server.

If the stripe is not full, the process of 814 to 825 is cyclically performed. If the stripe is full, the following process may be performed.

826. The client server sends, to the metadata server, indication information indicating that the stripe is full.

827. The metadata server marks the stripe as full.

The metadata server marks the stripe as full according to the indication information, for example, sets a fullness flag of the stripe to TRUE, to complete one full-stripe data writing process.

Figure 9A:
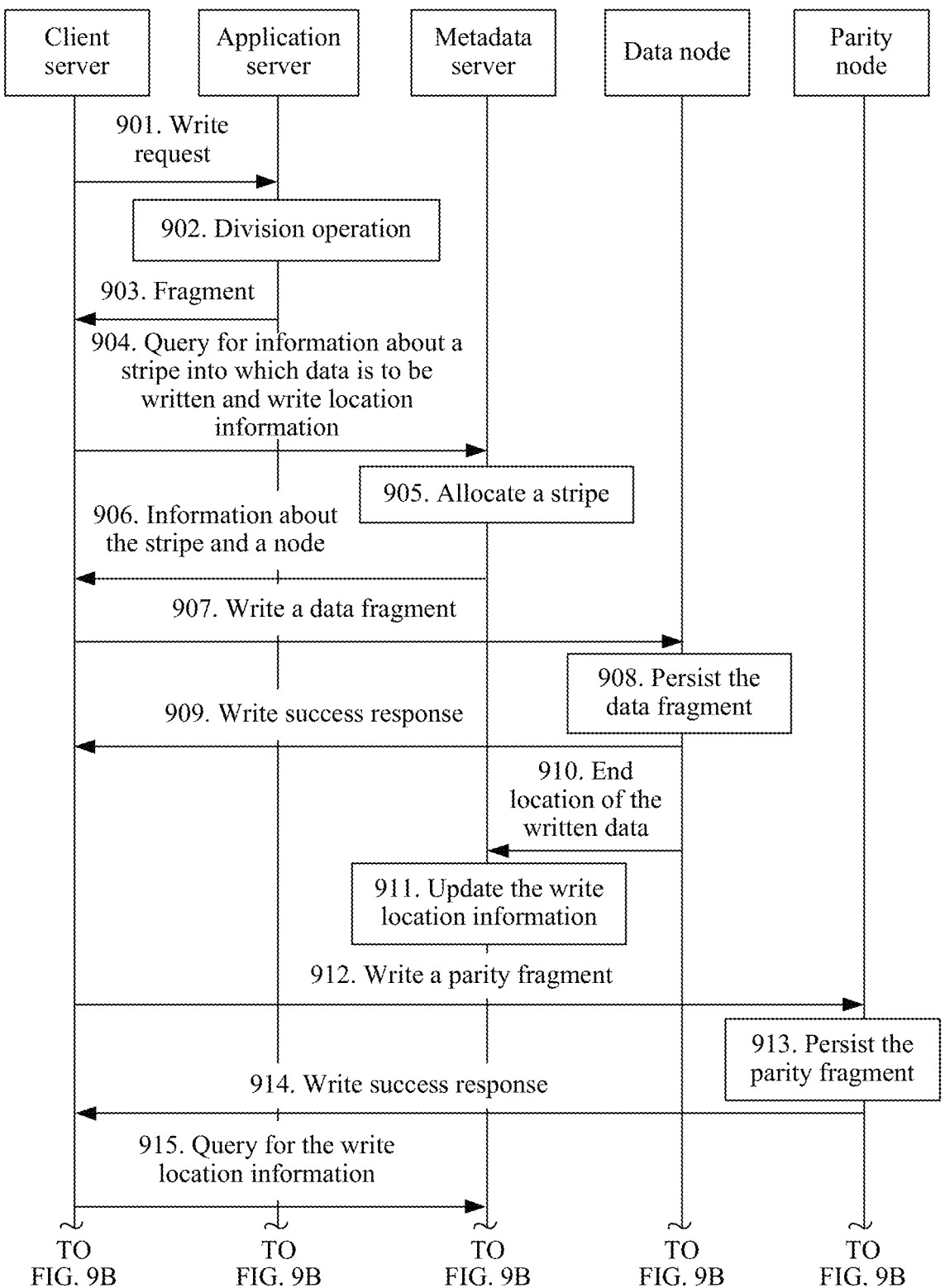
FIG. 9A and FIG. 9B are a flowchart of a data writing method according to another embodiment of this disclosure.
Figure 9B:
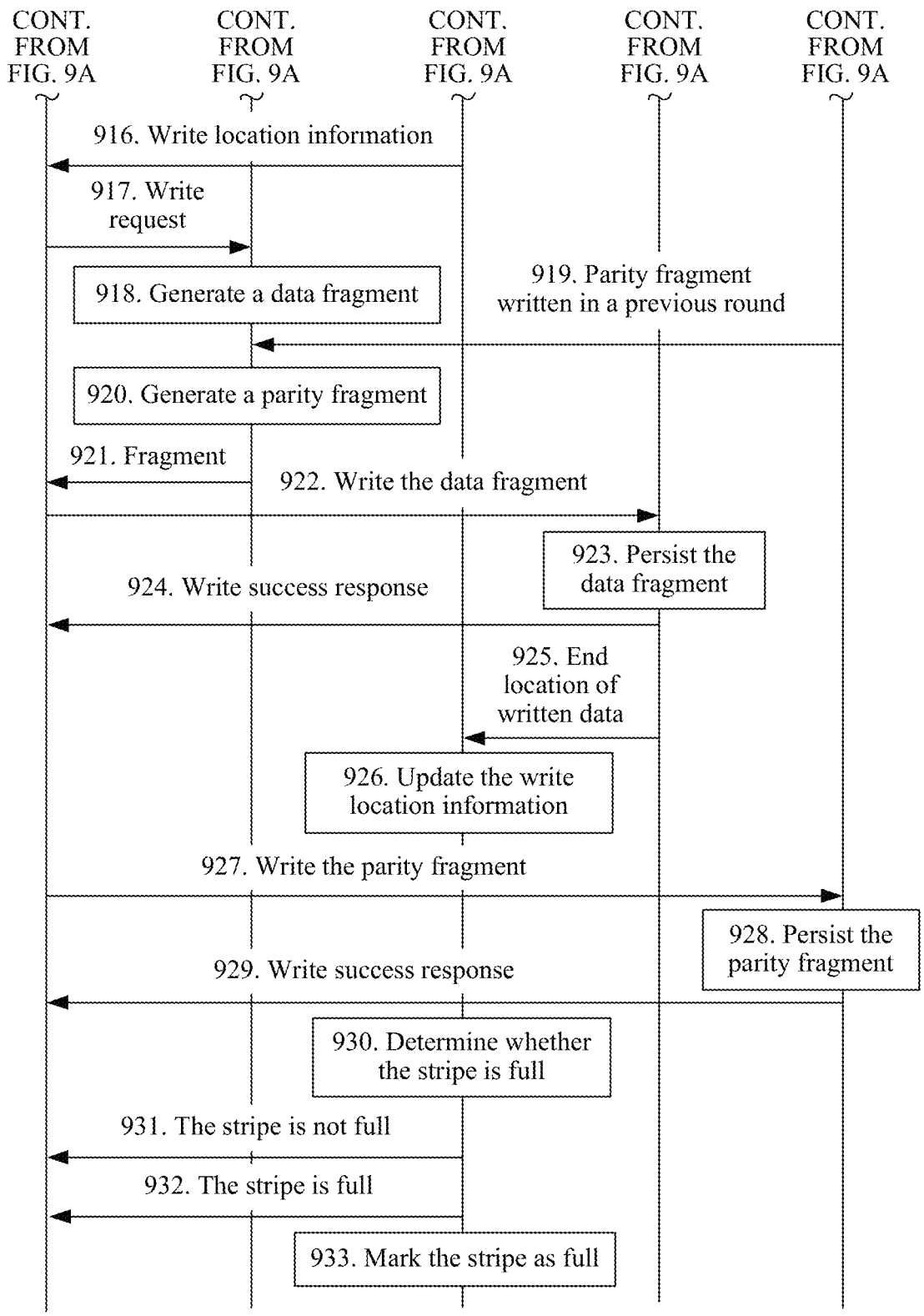

FIG. 9A and FIG. 9B are a flowchart of a data writing method according to another embodiment of this disclosure.

A difference between the embodiments shown in FIG. 9A and FIG. 9B and FIG. 8A and FIG. 8B lies in that in FIG. 9A and FIG. 9B, a metadata server stores write location information. Except this, for other related descriptions, refer to the embodiment shown in FIG. 8A and FIG. 8B. For brevity, details are not described herein again.

901. A client server sends a data write request to an application server.

When needing to store data, the client server sends the data write request to the application server, where the data write request includes the to-be-written data, for example, data such as a file or an object that needs to be written.

902. The application server performs a division operation.

After receiving the data write request of the client server, the application server performs the division operation on the to-be-written data based on a configured EC redundancy rate and shard size, and calculates a parity fragment. Because there is no write location information in this case, the application server may perform a fragment division operation based on the configured shard size.

903. The application server returns a data fragment and a parity fragment to the client server.

904. The client server queries the metadata server for information about a stripe into which data is to be written and write location information.

The client server queries the metadata server for stripe_id of the stripe into which the data needs to be written, a mapping relationship between the stripe and a node, and the write location information.

905. The metadata server allocates a stripe.

The metadata server may randomly select a stripe whose stripe_id_owner has an invalid value, allocate the stripe to the client server for data writing, and update the value of the stripe_id_owner to a number client_id of the client server. Because the stripe is a newly allocated stripe, there is no write location information, or the write location information may be a start location of the stripe.

906. The metadata server sends information about the allocated stripe and a corresponding node to the client server.

For example, the metadata server may send stripe_id of the allocated stripe and corresponding node_id to the client server. In addition, if there is write location information, the metadata server also sends the write location information to the client server.

907. The client server writes the data fragment.

For the newly allocated stripe, the client server starts data writing from the start location of the allocated stripe. The client server sends the data fragment to a corresponding data node.

908. A data node persists the data fragment.

The data node that receives the data fragment persists the data fragment to a hard disk drive.

909. The data node sends a write success response to the client server.

After successfully persisting the data fragment sent by the client server, the data node returns the write success response to the client server.

910. The data node sends an end location of the written data fragment in the data node to the metadata server.

911. The metadata server updates the write location information.

The metadata server may compare end locations of written data fragments in data nodes, to determine an end location of the written data fragment in the stripe, and further update the write location information.

912. The client server writes the parity fragment.

The client server sends the parity fragment to a corresponding parity node.

913. A parity node persists the parity fragment.

The parity node persists the parity fragment to a hard disk drive.

914. The parity node sends a write success response to the client server.

After the client server receives the responses indicating that the data fragment and the parity fragment are successfully written in a current round, current-round data writing succeeds.

915. The client server queries the metadata server for the write location information.

When new data needs to be stored, the client server first queries the metadata server for the write location information, namely, the end location of the data fragment that is written into the stripe in a previous round.

916. The metadata server returns the write location information to the client server.

917. The client server sends a data write request to the application server.

The client server sends the data write request to the application server, where the data write request includes to-be-written data and the write location information.

918. The application server generates a data fragment.

After receiving the data write request of the client server, the application server generates the data fragment of the to-be-written data based on the write location information.

919. The application server reads the parity fragment that is written into the stripe in a previous round.

920. The application server generates a parity fragment.

The application server generates the new parity fragment based on the new data fragment that is generated in the current round and the parity fragment that is written into the stripe in the previous round.

921. The application server returns the data fragment and the parity fragment to the client server.

922. The client server writes the data fragment.

The client server starts, based on the write location information, data writing from the end location of the data fragment that is written into the stripe in the previous round. The client server sends the data fragment to a corresponding data node.

923. A data node persists the data fragment.

The data node that receives the data fragment persists the data fragment to a hard disk drive. For example, the new data fragment may continue to be written in an append-only manner.

924. The data node sends a write success response to the client server.

After successfully persisting the data fragment sent by the client server, the data node returns the write success response to the client server.

925. The data node sends an end location of the written data fragment in the data node to the metadata server.

926. The metadata server updates the write location information.

The metadata server may compare end locations of written data fragments in data nodes, to determine an end location of the written data fragment in the stripe, and further update the write location information.

927. The client server writes the parity fragment.

The client server sends the parity fragment to a corresponding parity node.

928. A parity node persists the parity fragment.

The parity node persists the parity fragment to a hard disk drive.

929. The parity node sends a write success response to the client server.

After the client server receives the responses indicating that the data fragment and the parity fragment are successfully written in the current round, current-round data writing succeeds.

930. The metadata server determines whether the stripe is full.

The metadata server may determine, based on latest write location information, whether the stripe is full. If the stripe is not full, 931 is performed, or if the stripe is full, 932 and 933 are performed.

931. The metadata server sends, to the client server, indication information indicating that the stripe is not full.

The client server determines, based on the indication information, that the stripe is not full, and continues to cyclically perform the process of 915 to 931.

932. The metadata server sends, to the client server, indication information indicating that the stripe is full.

The client server determines, based on the indication information, that the stripe is full, and continues to write data into a next stripe.

933. The metadata server marks the stripe as full.

For example, the metadata server sets a fullness flag of the stripe to TRUE, to complete one full-stripe data writing process.

Figure 10A:
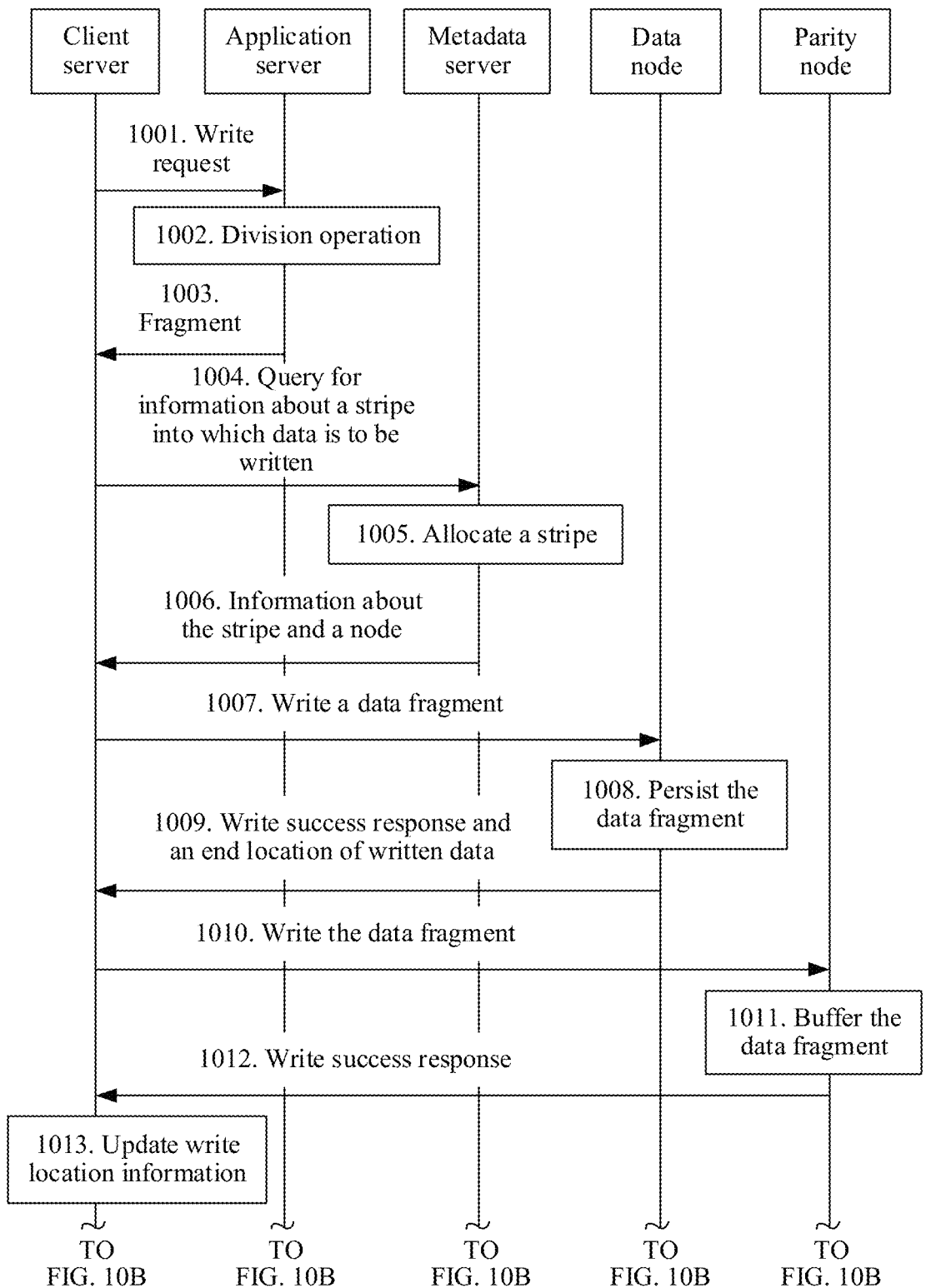
FIG. 10A and FIG. 10B are a flowchart of a data writing method according to another embodiment of this disclosure.
Figure 10B:
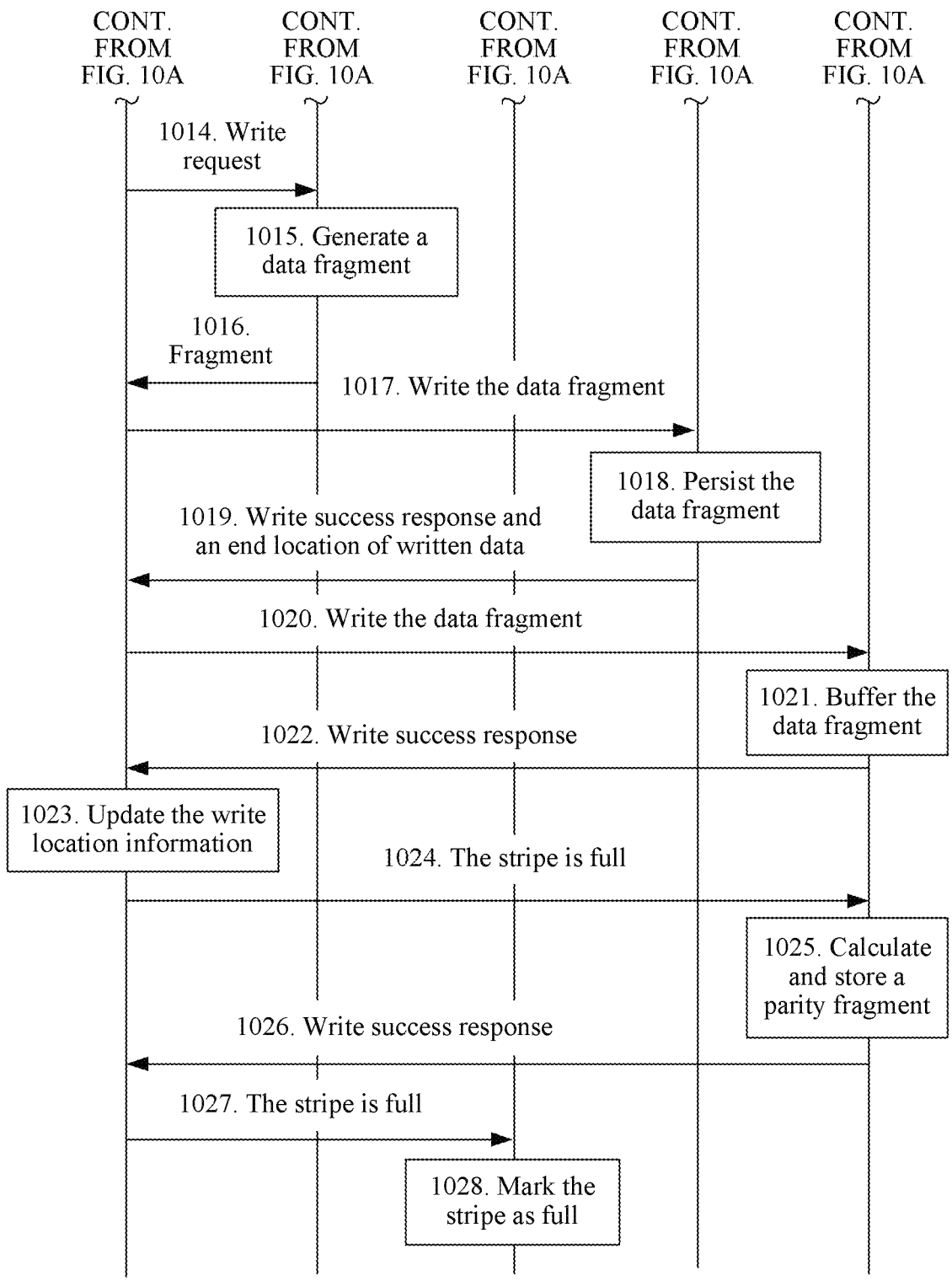

FIG. 10A and FIG. 10B are a flowchart of a data writing method according to another embodiment of this disclosure.

A difference between the embodiments shown in FIG. 10A and FIG. 10B and FIG. 8A and FIG. 8B lies in that in FIG. 10A and FIG. 10B, when a stripe is not full, no parity fragment is stored, and a parity fragment is stored when the stripe is full. Except this, for other related descriptions, refer to the embodiment shown in FIG. 8A and FIG. 8B. For brevity, details are not described herein again.

1001. A client server sends a data write request to an application server.

When needing to store data, the client server sends the data write request to the application server, where the data write request includes the to-be-written data, for example, data such as a file or an object that needs to be written.

1002. The application server performs a division operation.

After receiving the data write request of the client server, the application server performs the division operation on the to-be-written data based on a configured EC redundancy rate and shard size. Because there is no write location information in this case, the application server may perform a fragment division operation based on the configured shard size.

1003. The application server returns a data fragment to the client server.

1004. The client server queries a metadata server for information about a stripe into which data is to be written.

The client server queries the metadata server for stripe_id of the stripe into which the data needs to be written and a mapping relationship between the stripe and a node.

1005. The metadata server allocates a stripe.

The metadata server may randomly select a stripe whose stripe_id_owner has an invalid value, allocate the stripe to the client server for data writing, and update the value of the stripe_id_owner to a number client_id of the client server.

1006. The metadata server sends information about the allocated stripe and a corresponding node to the client server.

For example, the metadata server may send stripe_id of the allocated stripe and corresponding node_id to the client server.

1007. The client server writes the data fragment.

Because there is no write location information in this case, the client server starts data writing from a start location of the allocated stripe. The client server sends the data fragment to a corresponding data node.

1008. A data node persists the data fragment.

The data node that receives the data fragment persists the data fragment to a hard disk drive.

1009. The data node sends a write success response and an end location of the written data fragment to the client server.

After successfully persisting the data fragment sent by the client server, the data node returns the write success response to the client server. The response may include the end location of the written data fragment in the data node, or the data node sends the end location of the written data fragment in the data node to the client server when returning the write success response.

1010. The client server writes the data fragment into a parity node.

The client server sends the data fragment to the parity node corresponding to the stripe.

1011. The parity node buffers the data fragment.

The parity node buffers the received data fragment.

1012. The parity node sends a write success response to the client server.

1013. The client server updates write location information.

The client server may compare end locations of written data fragments in data nodes, to determine an end location of the written data fragment in the stripe, and further update the write location information in a memory of the client server.

1014. The client server sends a data write request to the application server.

When new data needs to be stored, the client server sends the data write request to the application server, where the data write request includes the to-be-written data and the write location information. The write location information represents the end location of the data fragment that is written into the stripe in a previous round.

1015. The application server generates a data fragment.

After receiving the data write request of the client server, the application server generates the data fragment of the to-be-written data based on the write location information. For a specific generation manner, refer to the foregoing embodiment. For brevity, details are not described herein again.

1016. The application server returns the data fragment to the client server.

1017. The client server writes the data fragment.

The client server starts, based on the write location information, data writing from the end location of the data fragment that is written into the stripe in the previous round. The client server sends the data fragment to a corresponding data node.

1018. A data node persists the data fragment.

The data node that receives the data fragment persists the data fragment to a hard disk drive. For example, the new data fragment may continue to be written in an append-only manner.

1019. The data node sends a write success response and an end location of the written data fragment to the client server.

After successfully persisting the data fragment sent by the client server, the data node returns the write success response to the client server. The response may include the end location of the written data fragment in the data node, or the data node sends the end location of the written data fragment in the data node to the client server when returning the write success response.

1020. The client server writes the data fragment into the parity node.

The client server sends the data fragment to a corresponding parity node.

1021. The parity node buffers the data fragment.

The parity node buffers the received data fragment.

1022. The parity node sends a write success response to the client server.

1023. The client server updates the write location information.

The client server may compare end locations of written data fragments in data nodes, to determine an end location of the written data fragment in the stripe, and further update the write location information stored in the memory of the client server.

If the stripe is not full, the process of 1014 to 1023 is cyclically performed. If the stripe is full, the following process may be performed.

1024. The client server sends, to the parity node, indication information indicating that the stripe is full.

1025. The parity node calculates and stores a parity fragment.

The parity node generates and stores the parity fragment of the stripe based on all buffered data fragments of the stripe. Then, the parity node may delete all buffered data fragments of the stripe.

1026. The parity node returns, to the client server, a response indicating that the parity fragment is successfully written.

1027. The client server sends, to the metadata server, indication information indicating that the stripe is full.

1028. The metadata server marks the stripe as full.

The metadata server marks the stripe as full according to the indication information, for example, sets a fullness flag of the stripe to TRUE, to complete one full-stripe data writing process.

Figure 11A:
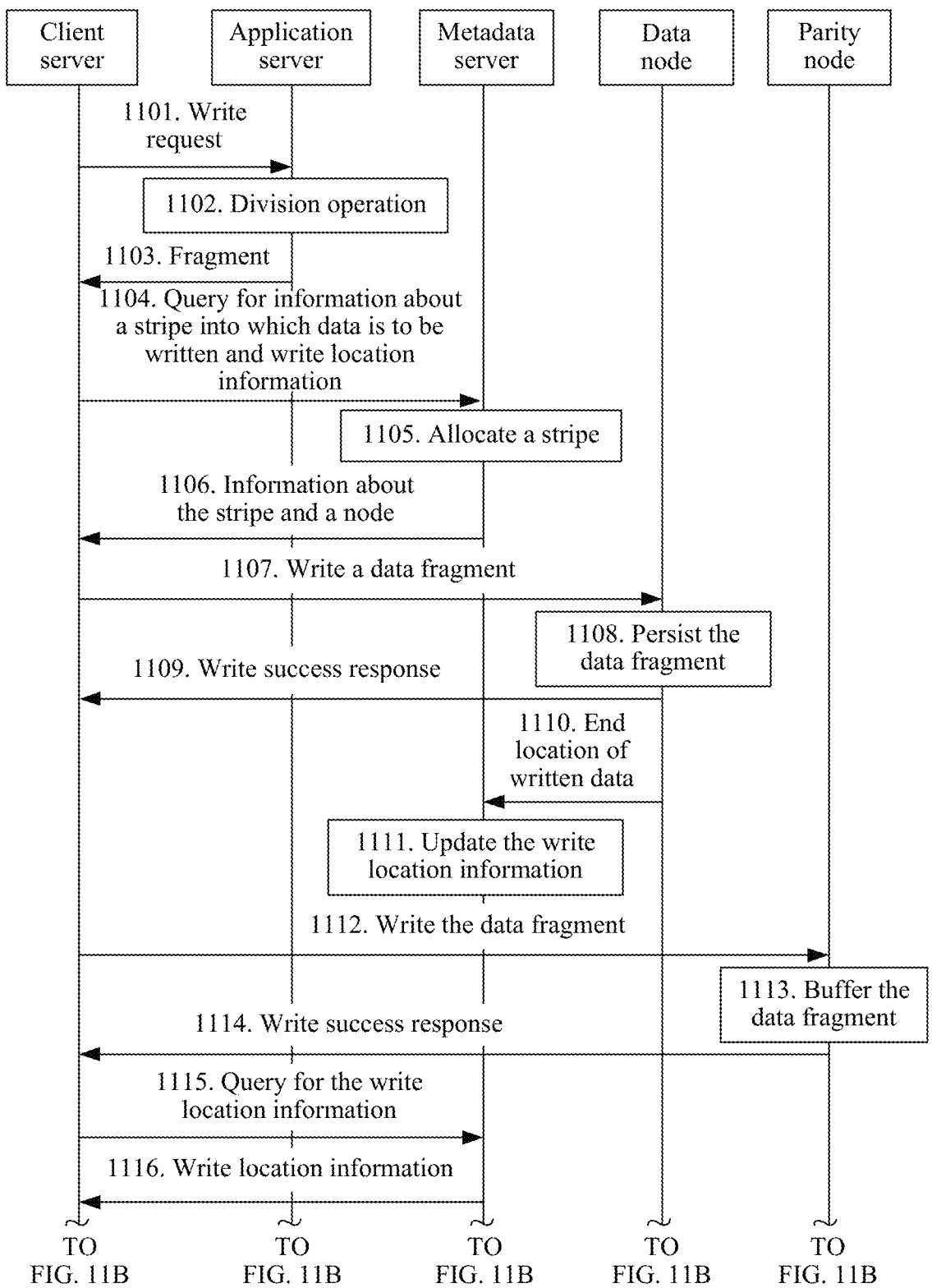
FIG. 11A and FIG. 11B are a flowchart of a data writing method according to another embodiment of this disclosure.
Figure 11B:
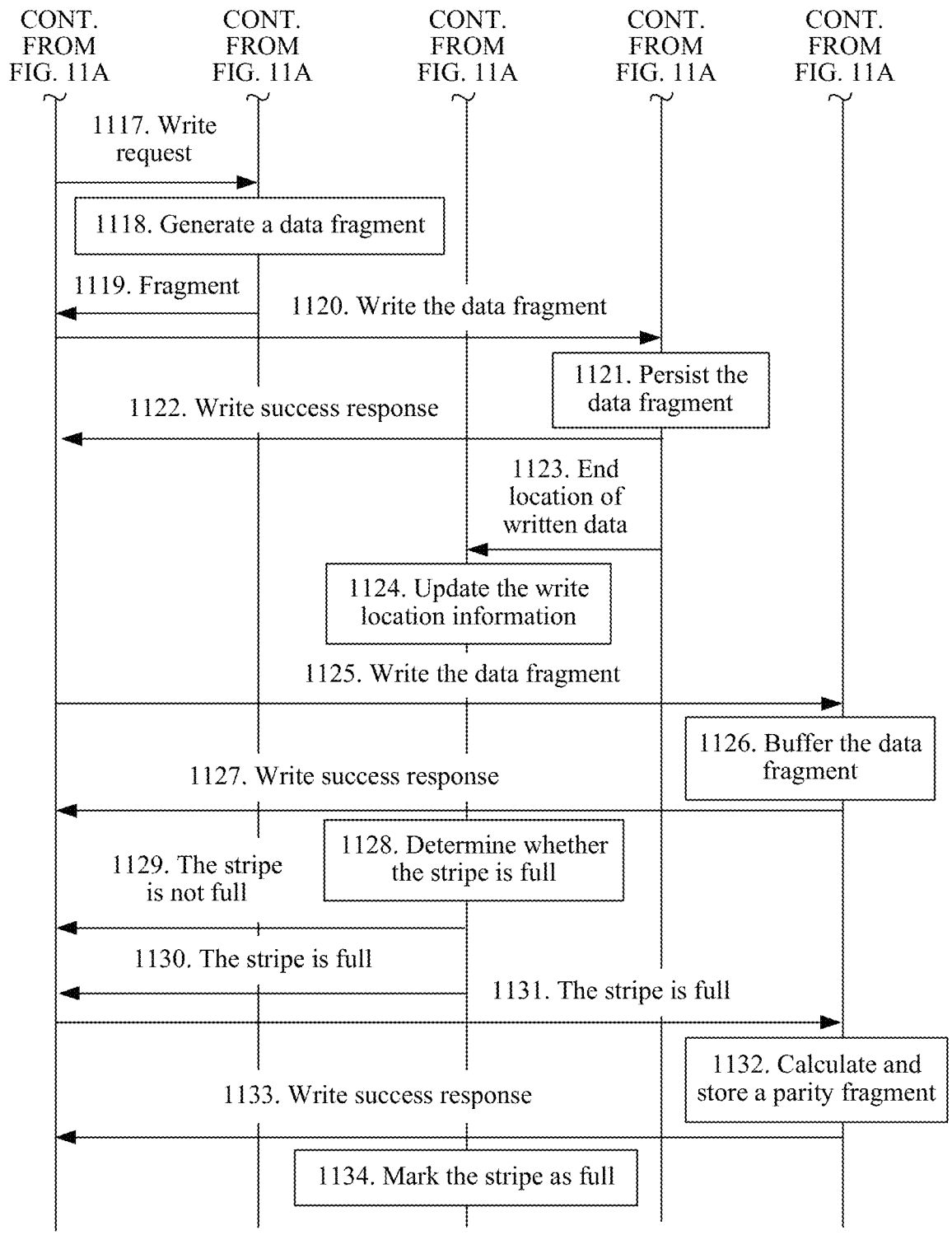

FIG. 11A and FIG. 11B are a flowchart of a data writing method according to another embodiment of this disclosure.

A difference between the embodiments shown in FIG. 11A and FIG. 11B and FIG. 9A and FIG. 9B lies in that in FIG. 11A and FIG. 11B, when a stripe is not full, no parity fragment is stored, and a parity fragment is stored when the stripe is full. Except this, for other related descriptions, refer to the embodiment shown in FIG. 9A and FIG. 9B. For brevity, details are not described herein again.

1101. A client server sends a data write request to an application server.

When needing to store data, the client server sends the data write request to the application server, where the data write request includes the to-be-written data, for example, data such as a file or an object that needs to be written.

1102. The application server performs a division operation.

After receiving the data write request of the client server, the application server performs the division operation on the to-be-written data based on a configured EC redundancy rate and shard size. Because there is no write location information in this case, the application server may perform a fragment division operation based on the configured shard size.

1103. The application server returns a data fragment to the client server.

1104. The client server queries a metadata server for information about a stripe into which data is to be written and write location information.

The client server queries the metadata server for stripe_id of the stripe into which the data needs to be written, a mapping relationship between the stripe and a node, and the write location information.

1105. The metadata server allocates a stripe.

The metadata server may randomly select a stripe whose stripe_id_owner has an invalid value, allocate the stripe to the client server for data writing, and update the value of the stripe_id_owner to a number client_id of the client server. Because the stripe is a newly allocated stripe, there is no write location information, or the write location information may be a start location of the stripe.

1106. The metadata server sends information about the allocated stripe and a corresponding node to the client server.

For example, the metadata server may send stripe_id of the allocated stripe and corresponding node_id to the client server. In addition, if there is write location information, the metadata server also sends the write location information to the client server.

1107. The client server writes the data fragment.

For the newly allocated stripe, the client server starts data writing from the start location of the allocated stripe. The client server sends the data fragment to a corresponding data node.

1108. A data node persists the data fragment.

The data node that receives the data fragment persists the data fragment to a hard disk drive.

1109. The data node sends a write success response to the client server.

After successfully persisting the data fragment sent by the client server, the data node returns the write success response to the client server.

1110. The data node sends an end location of the written data fragment in the data node to the metadata server.

1111. The metadata server updates the write location information.

The metadata server may compare end locations of written data fragments in data nodes, to determine an end location of the written data fragment in the stripe, and further update the write location information.

1112. The client server writes the data fragment into a parity node.

The client server sends the data fragment to the parity node corresponding to the stripe.

1113. The parity node buffers the data fragment.

The parity node buffers the received data fragment.

1114. The parity node sends a write success response to the client server.

1115. The client server queries the metadata server for the write location information.

When new data needs to be stored, the client server first queries the metadata server for the write location information, namely, the end location of the data fragment that is written into the stripe in a previous round.

1116. The metadata server returns the write location information to the client server.

1117. The client server sends a data write request to the application server.

The client server sends the data write request to the application server, where the data write request includes the to-be-written data and the write location information.

1118. The application server generates a data fragment.

After receiving the data write request of the client server, the application server generates the data fragment of the to-be-written data based on the write location information.

1119. The application server returns the data fragment to the client server.

1120. The client server writes the data fragment.

The client server starts, based on the write location information, data writing from the end location of the data fragment that is written into the stripe in the previous round. The client server sends the data fragment to a corresponding data node.

1121. A data node persists the data fragment.

The data node that receives the data fragment persists the data fragment to a hard disk drive. For example, the new data fragment may continue to be written in an append-only manner.

1122. The data node sends a write success response to the client server.

After successfully persisting the data fragment sent by the client server, the data node returns the write success response to the client server.

1123. The data node sends an end location of the written data fragment in the data node to the metadata server.

1124. The metadata server updates the write location information.

The metadata server may compare end locations of written data fragments in data nodes, to determine an end location of the written data fragment in the stripe, and further update the write location information.

1125. The client server writes the data fragment into the parity node.

The client server sends the data fragment to the corresponding parity node.

1126. The parity node buffers the data fragment.

The parity node buffers the received data fragment.

1127. The parity node sends a write success response to the client server.

1128. The metadata server determines whether the stripe is full.

The metadata server may determine, based on latest write location information, whether the stripe is full. If the stripe is not full, 1129 is performed, or if the stripe is full, 1130 is performed.

1129. The metadata server sends, to the client server, indication information indicating that the stripe is not full.

The client server determines, based on the indication information, that the stripe is not full, and continues to cyclically perform the process of 1115 to 1129.

1130. The metadata server sends, to the client server, indication information indicating that the stripe is full.

1131. The client server sends, to the parity node, the indication information indicating that the stripe is full.

1132. The parity node calculates and stores a parity fragment.

The parity node generates and stores the parity fragment of the stripe based on all buffered data fragments of the stripe. Then, the parity node may delete all buffered data fragments of the stripe.

1133. The parity node returns, to the client server, a response indicating that the parity fragment is successfully written.

1134. The metadata server marks the stripe as full.

For example, the metadata server sets a fullness flag of the stripe to TRUE, to complete one full-stripe data writing process.

In the technical solution of this embodiment of this disclosure, when data does not meet a full stripe, no '0' filling data is generated, so that a total quantity of stripes needed by the data can be reduced, stripe management complexity can be reduced, a speed of searching for a stripe can be increased, a fault rectification speed can be increased, transmission and persistence of the '0' filling data can be avoided, write amplification of a network and a hard disk drive can be reduced, and an operation of migrating invalid data can be reduced, thereby improving storage efficiency of a storage system.

It should be understood that sequence numbers of the foregoing processes do not mean execution sequences in various embodiments of this disclosure. The execution sequences of the processes should be determined according to functions and internal logic of the processes, and should not be construed as any limitation on the implementation processes of the embodiments of this disclosure.

It should be further understood that a specific example in the embodiments of this disclosure is merely used to help a person skilled in the art to better understand the embodiments of this disclosure, but is not intended to limit the scope of the embodiments of this disclosure.

The foregoing describes in detail the data writing method in the embodiments of this disclosure, and the following describes a client server in the embodiments of this disclosure. It should be understood that the client server in the embodiments of this disclosure may perform the methods in the foregoing embodiments of this disclosure. To be specific, for specific working processes of the following various products, refer to corresponding processes in the foregoing method embodiments.

Figure 12:
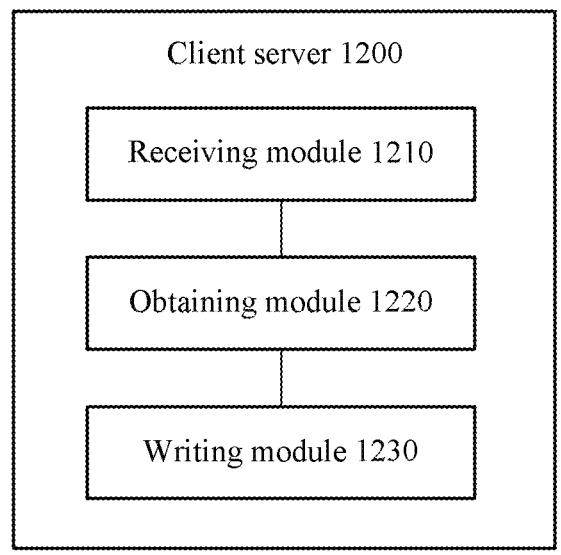
FIG. 12 is a schematic block diagram of a client server according to an embodiment of this disclosure.

FIG. 12 is a schematic block diagram of a client server 1200 according to an embodiment of this disclosure.

As shown in FIG. 12, the client server 1200 may include a receiving module 1210, an obtaining module 1220, and a writing module 1230.

The receiving module 1210 is configured to receive first data.

The obtaining module 1220 is configured to: obtain write location information of a target stripe, where the write location information indicates a location that is of a written data fragment in the target stripe, the target stripe includes a plurality of shards, each shard corresponds to one storage node, the storage node communicates with the client server, and the target stripe is not full; and obtain one or more data fragments of the first data, where each data fragment corresponds to one shard having idle space in the plurality of shards, and the one or more data fragments of the first data are generated based on the write location information, or the one or more data fragments of the first data are generated based on a size of a shard.

The writing module 1230 is configured to send a write request to a storage node of a shard corresponding to the one or more data fragments of the first data, where the write request is used to store the one or more data fragments of the first data into the corresponding shard.

Optionally, in an embodiment of this disclosure, the write location information is used to indicate an end location of the written data fragment in the target stripe; and the one or more data fragments of the first data are generated in one of the following manners:

when the end location of the written data fragment in the target stripe is an end location of a particular shard, the first data is divided based on a size of the shard, to generate the one or more data fragments of the first data, and if a size of the first data is less than the size of the shard, the first data is used as one data fragment; and when the end location of the written data fragment in the target stripe is not the end location of the particular shard, one data fragment is first divided from the first data based on a size of a portion that is of the particular shard and in which no data is written, where the data fragment obtained through division corresponds to the portion that is of the particular shard and in which no data is written; then a remaining part of the first data is divided based on the size of the shard, where each data fragment divided from the remaining part of the first data corresponds to one empty shard; and if the size of the first data is less than the size of the portion that is of the particular shard and in which no data is written, the first data is used as one data fragment.

Optionally, in an embodiment of this disclosure, the one or more data fragments of the first data are generated in the following manner:

the first data is divided based on the size of the shard, to generate the one or more data fragments of the first data, and if a size of the first data is less than the size of the shard, the first data is used as one data fragment.

Optionally, in an embodiment of this disclosure, the one or more data fragments of the first data are generated in the following manner:

when the first data meets a first condition, the one or more data fragments of the first data are generated based on the write location information, or when the first data meets a second condition, the one or more data fragments of the first data are generated based on the size of the shard.

Optionally, in an embodiment of this disclosure, the write location information includes an offset of the written data fragment in the target stripe, and a number of a node of the written data fragment.

Optionally, in an embodiment of this disclosure, the target stripe includes a parity fragment of the written data fragment, and the obtaining module 1220 is further configured to:

calculate a common parity fragment of the written data fragment and the one or more data fragments based on the one or more data fragments and the parity fragment of the written data fragment; and the writing module 1230 is further configured to store the calculated parity fragment into a parity shard of the target stripe.

Optionally, in an embodiment of this disclosure, a buffer of the client server includes a parity fragment of the written data fragment, and the obtaining module 1220 is further configured to:

calculate a common parity fragment of the written data fragment and the one or more data fragments based on the one or more data fragments and the parity fragment of the written data fragment; and the writing module 1230 is further configured to: store the calculated parity fragment into the buffer of the client server; and after all data shards of the target stripe are full of data fragments, store, into a parity shard of the target stripe, a parity fragment that corresponds to the target stripe and that is in the buffer of the client server.

Optionally, in an embodiment of this disclosure, the storage node includes a parity node used to store a parity fragment, and the writing module 1230 is further configured to:

send the one or more data fragments to one or more parity nodes for backup; and after all data shards of the target stripe are full of data fragments, instruct the one or more parity nodes to generate a parity fragment based on all data fragments in the target stripe that are backed up, and store the generated parity fragment into a parity shard of the target stripe.

Optionally, in an embodiment of this disclosure, the obtaining module 1220 is specifically configured to perform one of the following operations:

dividing the first data to generate the one or more data fragments of the first data; and sending the write location information and the first data to an application server, and then obtaining the one or more data fragments of the first data from the application server.

Optionally, in an embodiment of this disclosure, the receiving module 1210 is further configured to receive second data;

the obtaining module 1220 is further configured to: obtain an unused stripe as the target stripe, where a size of the second data is less than a size of the target stripe; obtain at least one data fragment of the second data, where the data fragment of the second data is generated based on the size of the shard; and determine a shard corresponding to the data fragment of the second data; and the writing module 1230 is further configured to: write the data fragment of the second data into the corresponding shard; and record a write location of the data fragment of the second data in the target stripe as the write location information.

Optionally, in an embodiment of this disclosure, the write location information is stored in a memory of the client server, or the write location information is stored in a metadata server.

Optionally, in an embodiment of this disclosure, a metadata server is configured to store a mapping relationship between a stripe and a node, and send, to the client server, information about the stripe and information about a data node and a parity node that correspond to the stripe; and the obtaining module 1220 is further configured to obtain, from the metadata server, the information about the stripe and the information about the data node and the parity node that correspond to the stripe.

Optionally, in an embodiment of this disclosure, the metadata server is further configured to: when the stripe is full, mark the stripe as full.

The client server 1200 in this embodiment of this disclosure may be configured to perform a corresponding process in the foregoing method embodiment. For corresponding specific descriptions, refer to the foregoing embodiments. For brevity, details are not described herein again.

Figure 13:
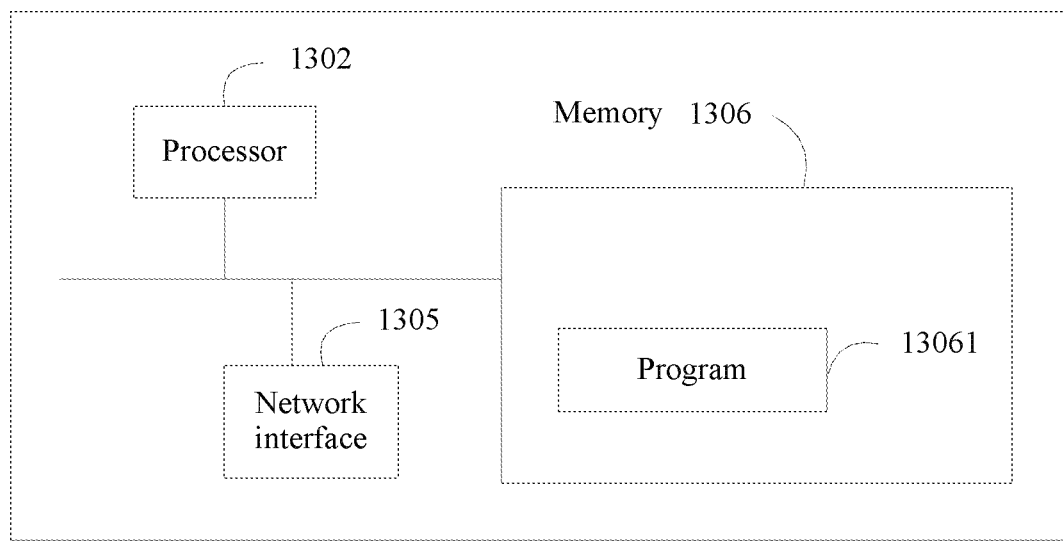
FIG. 13 is a schematic block diagram of a client server according to another embodiment of this disclosure.

FIG. 13 is a schematic structural diagram of a client server according to another embodiment of this disclosure. The client server includes at least one processor 1302 (for example, a CPU), at least one network interface 1305 or another communications interface, and a memory 1306. The components are communicatively connected. The processor 1302 is configured to perform an executable module stored in the memory 1306, for example, a computer program. The client server is communicatively connected to at least one other network element through the at least one network interface 1305 (which may be wired or wireless).

In some implementations, the memory 1306 stores a program 13061, and the processor 1302 executes the program 13061, to perform the methods in the foregoing embodiments of this disclosure.

An embodiment of this disclosure further provides a computer readable storage medium. The computer readable storage medium stores an instruction. When the instruction is run on a computer, the computer performs the methods in the foregoing embodiments of this disclosure.

An embodiment of this disclosure further provides a system. The system may include the client server in the foregoing embodiments and a plurality of nodes. The nodes may include a data node, a parity node, and a metadata server. The system may further include an application server.

This disclosure further provides a computer program product including an instruction. When the computer program product is run on a client server, the client server has the foregoing functions, for example, the steps performed by the client server in the foregoing embodiments.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instruction is loaded and executed on a computer, all or a part of the processes or functions according to the embodiments of this disclosure are generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any available medium accessible by a computer, or a data storage device, such as a server or a data center, integrating one or more usable media. The available medium may be a magnetic medium (for example, a floppy disk, a hard disk drive, or a magnetic tape), an optical medium (for example, a DVD), a semiconductor medium (for example, a solid state drive (Solid State Drive, SSD)), or the like.

It should be understood that in the embodiments of this disclosure, the term "first" and the like are merely intended to represent objects, but do not indicate a sequence between corresponding objects.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for particular applications, but it should not be considered that the implementation goes beyond the scope of this disclosure.

It may be clearly understood by a person skilled in the art that, for the purpose of convenient and brief description, for specific working processes of the system, apparatus, and unit, refer to a corresponding process in the method embodiments. Details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk drive, a read-only memory (ROM), a random access memory (RAM), a magnetic disk, or an optical disc.

What is claimed is:

1. A data writing method, comprising:
  receiving, by a device, second data;
  obtaining, by the device, data fragments from the second data according to a stripe unit size of stripes in a storage system;
  identifying a target stripe for writing the second data, wherein the target stripe comprises a plurality of data units and at least one parity unit distributed across a plurality of data nodes and at least one parity node in the storage system;
  storing, by the device, the data fragments of the second data into corresponding data units of the target stripe;
  writing, by the device, the data fragments of the second data into the at least one parity node for buffering the second data;
  receiving, by the device, first data;
  dividing, by the device, the first data into data fragments based on the stripe unit size;
  storing, by the device, the data fragments of the first data into corresponding data units of the target stripe subsequent to the data fragments of the second data stored in the target stripe;
  writing, by the device, the data fragments of the first data into the at least one parity node for buffering the first data;
  indicating, by the device to the at least one parity node, that the target stripe is full;
  generating, by the at least one parity node in response to the target stripe being full, at least one parity fragment of the target stripe based on data fragments corresponding to the target stripe buffered on the at least one parity node; and
  storing, by the at least one parity node, the at least one parity fragment into the at least one parity unit of the target stripe.

2. The method according to claim 1, further comprising:
  deleting, by the at least one parity node, the data fragments corresponding to the target stripe buffered on the at least one parity node after storing the at least one parity fragment of the target stripe.

3. A storage system comprising:
  a client server; and
  a plurality of data nodes and at least one parity node;
  wherein the client server is configured to:
    receive second data;
    obtain data fragments from the second data according to a stripe unit size of stripes in the storage system;
    identify a target stripe for writing the second data, wherein the target stripe comprises a plurality of data units and at least one parity unit distributed across the plurality of data nodes and the at least one parity node in the storage system;

store the data fragments of the second data into corresponding data units of the target stripe;

write the data fragments of the second data into the at least one parity node for buffering the second data;

receive first data;

divide the first data into data fragments based on the stripe unit size;

store the data fragments of the first data into corresponding data units of the target stripe subsequent to the data fragments of the second data stored in the target stripe;

write the data fragments of the first data into the at least one parity node for buffering the first data; and indicate, to the at least one parity node, that the target stripe is full;

wherein the at least one parity node is configured to:

in response to the target stripe being full, generate at least one parity fragment of the target stripe based on data fragments corresponding to the target stripe buffered on the at least one parity node; and store the at least one parity fragment into the at least one parity unit of the target stripe.

4. The storage system according to claim 3, wherein the at least one parity node is further configured to:

delete the data fragments corresponding to the target stripe buffered on the at least one parity node after storing the at least one parity fragment of the target stripe.

* * * * *